(12) United States Patent
Mizusaki et al.

(10) Patent No.: US 8,345,201 B2
(45) Date of Patent: Jan. 1, 2013

(54) ALIGNMENT FILM MATERIAL COMPRISING POLYIMIDE AND A VINYL-TYPE MONOMER, ALIGNMENT FILM COMPRISING POLYIMIDE AND POLYVINYL COMPOUND, METHOD OF FORMING THE ALIGNMENT FILM, AND LIQUID CRYSTAL DISPLAY HAVING THE SAME

(75) Inventors: Masanobu Mizusaki, Osaka (JP); Yohei Nakanishi, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 52 days.

(21) Appl. No.: 13/125,404

(22) PCT Filed: Jun. 23, 2009

(86) PCT No.: PCT/JP2009/002862
§ 371 (c)(1),
(2), (4) Date: Apr. 21, 2011

(87) PCT Pub. No.: WO2010/047011
PCT Pub. Date: Apr. 29, 2010

(65) Prior Publication Data
US 2011/0199566 A1    Aug. 18, 2011

(30) Foreign Application Priority Data

Oct. 21, 2008  (JP) ................................. 2008-271376

(51) Int. Cl.
*G02F 1/141* (2006.01)
*G02F 1/1337* (2006.01)

(52) U.S. Cl. ...................... 349/135; 349/124; 349/128

(58) Field of Classification Search ........... 349/123–136
See application file for complete search history.

(56) References Cited

U.S. PATENT DOCUMENTS

| 5,786,041 | A  | 7/1998 | Takenaka et al. |
| 7,465,479 | B2 | 12/2008 | Bremer et al. |
| 7,807,068 | B2 | 10/2010 | Bremer et al. |
| 2006/0051524 | A1* | 3/2006 | Gibbons et al. ................ 428/1.2 |

(Continued)

FOREIGN PATENT DOCUMENTS

EP    1 507 161 A1    2/2005

(Continued)

OTHER PUBLICATIONS

English translation of the International Preliminary Report on Patentability mailed May 26, 2011 in corresponding PCT Application No. PCT/ JP2009/002862.

(Continued)

*Primary Examiner* — Mark Robinson
*Assistant Examiner* — Paul Lee
(74) *Attorney, Agent, or Firm* — Nixon & Vanderhye, P.C.

(57) ABSTRACT

An alignment film material according to the present invention includes: a precursor of a first polyimide (p1); a second polyimide (p2) and a precursor thereof; and a vinyl-type monomer. The vinyl-type monomer is represented by general formula (1) P1-A1-(Z1-A2)n-P2 (in general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and Z1 is a —COO— group, a —OCO— group, a —O— group, a —CONH— group or a single bond, where n is 0 or 1).

25 Claims, 6 Drawing Sheets

U.S. PATENT DOCUMENTS

2007/0098921 A1* 5/2007 Liang et al. .................... 428/1.5
2008/0143926 A1* 6/2008 Amimori et al. ................. 349/75

FOREIGN PATENT DOCUMENTS

| | | |
|---|---|---|
| JP | 6-202118 | 7/1994 |
| JP | 7-101904 | 4/1995 |
| JP | 8-334771 | 12/1996 |
| JP | 9-185066 | 7/1997 |
| JP | 11-352486 | 12/1999 |
| JP | 2003-261511 | 9/2003 |
| JP | 2007-304509 | 11/2007 |
| JP | 2009-132718 | 6/2009 |
| WO | WO 2006/121220 | 11/2006 |

OTHER PUBLICATIONS

International Search Report for PCT/JP2009/002862, mailed Sep. 29, 2009.

Kwak, M. et al., "Observation of Hybrid Type Alignment Film in TFT-LCD", Proceedings of Japanese Liquid Crystal Society Annual Meeting, (Sep. 2007), PA03, 3 pages.

* cited by examiner

ALIGNMENT FILM MATERIAL COMPRISING POLYIMIDE AND A VINYL-TYPE MONOMER, ALIGNMENT FILM COMPRISING POLYIMIDE AND POLYVINYL COMPOUND, METHOD OF FORMING THE ALIGNMENT FILM, AND LIQUID CRYSTAL DISPLAY HAVING THE SAME

This application is the U.S. national phase of International Application No. PCT/JP20091002862, filed 23 Jun. 2009, which designated the U.S. and claims priority to JP Application No. 2008-271376, filed 21 Oct. 2008, the entire contents of each of which are hereby incorporated by reference.

TECHNICAL FIELD

The present invention relates to an alignment film, an alignment film material, and a liquid crystal display device having the alignment film, as well as methods of forming the same.

BACKGROUND ART

Liquid crystal display devices are used not only as small-sized display devices, e.g., the display sections of mobile phones, but also as large-sized television sets. Liquid crystal display devices of the TN (Twisted Nematic) mode, which have often been used conventionally, have relatively narrow viewing angles. In recent years, however, liquid crystal display devices with wide viewing angles have been produced, e.g., the IPS (In-Plane Switching) mode and the VA (Vertical Alignment) mode. Among such modes with wide viewing angles, the VA mode is adopted in a large number of liquid crystal display devices because of an ability to realize a high contrast ratio.

A liquid crystal display device includes an alignment film which defines an alignment direction of liquid crystal molecules in its neighborhood. In a VA-mode liquid crystal display device, an alignment film causes liquid crystal molecules to be aligned substantially perpendicularly to its principal face. Generic alignment films are made of polyimide, which has advantages in terms of thermal resistance, solvent resistance, hygroscopicity, and so on.

As one kind of VA mode, the MVA (Multi-domain Vertical Alignment) mode is known, under which a plurality of liquid crystal domains are created in one pixel region. An MVA-mode liquid crystal display device includes alignment regulating structures provided on the liquid-crystal-layer side of at least one of a pair of opposing substrates, between which a vertical-alignment type liquid crystal layer is interposed. The alignment regulating structures may be linear slits (apertures) or ribs (protruding structures) that are provided on electrodes, for example. The alignment regulating structures provide alignment regulating forces from one side or both sides of the liquid crystal layer, thus creating a plurality of liquid crystal domains (typically four liquid crystal domains) with different alignment directions, whereby the viewing angle characteristics are improved.

As another kind of VA mode, the CPA (Continuous Pinwheel Alignment) mode is also known. In a generic liquid crystal display device of the CPA mode, pixel electrodes of a highly symmetrical shape are provided, and on a counter electrode, protrusions are provided corresponding to the centers of liquid crystal domains. These protrusions are also referred to as rivets. When a voltage is applied, in accordance with an oblique electric field which is created with the counter electrode and a highly symmetrical pixel electrode, liquid crystal molecules take an inclined alignment of a radial shape. Moreover, the inclined alignment of the liquid crystal molecules are stabilized due to the alignment regulating forces of side slopes of the rivets. Thus, the liquid crystal molecules in one pixel are aligned in a radial shape, thereby improving the viewing angle characteristics.

Unlike in TN-mode liquid crystal display devices in which the pretilt direction of liquid crystal molecules is defined by an alignment film, alignment regulating forces in an MVA-mode liquid crystal display device are applied to the liquid crystal molecules by linear slits or ribs. Therefore, depending on distances from the slits and ribs, the alignment regulating forces for the liquid crystal molecules within a pixel region will differ, thus resulting in differing response speeds of the liquid crystal molecules within the pixel. Similarly, also in the CPA mode, the response speeds of the liquid crystal molecules will differ within the pixel, and the differences in response speed will become more outstanding as the pixel electrodes increase in size. Furthermore, in a VA-mode liquid crystal display device, the light transmittance in the regions in which slits, ribs, or rivets are provided is low, thus making it difficult to realize a high luminance.

In order to avoid the above problems, use of an alignment film for applying alignment regulating forces to liquid crystal molecules in a VA-mode liquid crystal display device is also known, such that the liquid crystal molecules will tilt from the normal direction of a principal face of the alignment film in the absence of an applied voltage (see, for example, Patent Documents 1 and 2).

In the liquid crystal display device disclosed in Patent Document 1, the alignment film is subjected to an alignment treatment such as rubbing. The alignment film aligns the liquid crystal molecules so that the liquid crystal molecules will be aligned with a tilt from the normal direction of its principal face even in the absence of an applied voltage, whereby an improved response speed is realized. Furthermore, since the alignment film defines the pretilt azimuth of liquid crystal molecules so that the liquid crystal molecules within one pixel will be symmetrically aligned, the viewing angle characteristics are improved. In a liquid crystal display device disclosed in Patent Document 1, four liquid crystal domains are formed in a liquid crystal layer in accordance with a combination of two alignment regions of a first alignment film and two alignment regions of a second alignment film, whereby a wide viewing angle is realized.

An alignment film disclosed in Patent Document 2 is made of a photosensitive material having a photoreactive functional group as a side chain, and by obliquely radiating light onto this alignment film, a pretilt is conferred so that the liquid crystal molecules will be inclined from the normal direction of a principal face of the alignment film in the absence of an applied voltage. An alignment film which a pretilt is conferred through such a photo-alignment treatment may also be referred to as a photo-alignment film. In the photo-alignment film disclosed in Patent Document 2, fluctuations in the pretilt angle are controlled to 1° or less, by using an alignment film material which includes a bonded structure of photoreactive functional groups.

An alignment film which is made of one polymer may not attain adequate characteristics. Therefore, use of two different polymers to form an alignment film is under study (see Patent Document 3 and Non-Patent Document 1).

An alignment film disclosed in Patent Document 3 includes a main layer which is made of a first polymer having a large molecular weight and/or polarity, and a surface layer which is made of a second polymer having a small molecular weight and/or polarity. As the first polymer, a material including an aromatic (e.g., SE7690 manufactured by NISSAN CHEMICAL INDUSTRIES, LTD.), which hardly gives rise to any internal DC bias voltage, is used. On the other hand, the second polymer, which is a material that undergoes a large change in the pretilt angle in response to ultraviolet irradiation, is a cyclobutane-type polymer material. In Patent Document 3, SE7210 manufactured by NISSAN CHEMICAL INDUSTRIES, LTD. is used as the second polymer.

Non-Patent Document 1 discloses an alignment film including a lower layer whose main component is polyamic acid and an upper layer whose main component is polyimide. In Non-Patent Document 1, isolation into the two layers of the upper layer and the lower layer is achieved by appropriately setting a pre-bake temperature and time.

CITATION LIST

Patent Literature

[Patent Document 1] Japanese Laid-Open Patent Publication No. 11-352486
[Patent Document 2] The pamphlet of International Publication No. 2006/121220
[Patent Document 3] Japanese Laid-Open Patent Publication No. 8-334771

Non-Patent Literature

[Non-Patent Document 1] Mu-Sun Kwak et al., "Observation of Hybrid Type Alignment Film in TFT-LCD", Proceedings of 2007 Japanese Liquid Crystal Society Annual meeting, September 2007, PA03, p138

SUMMARY OF INVENTION

Technical Problem

Generally speaking, when a liquid crystal display device keeps displaying the same pattern for a long time, the previous pattern may remain even after the displayed image is changed. Such a phenomenon is also called image sticking. For example, after displaying white in a partial region of the screen and black in another region for a long time, if the entire liquid crystal panel is caused to display the same intermediate gray scale level, the region previously displaying white may appear slightly brighter than the region previously displaying black.

One cause of such image sticking is charge accumulation. The amount of charge accumulated in the region which was displaying black is different from the amount of charge accumulated in the region which was displaying white, and an electric field occurs because impurity ions in the liquid crystal accumulate at the interface between the alignment film and the liquid crystal layer. Therefore, when entirely switched to the same gray scale level, different voltages are applied to the layers of liquid crystal in the respective regions which were displaying white and black, thus being perceived as image sticking.

Note that image sticking caused by such charge accumulation can be somewhat suppressed by applying voltages of inverted polarities to the respective pixels. Therefore, an image sticking caused by charge accumulation is also called DC image sticking. The driving which involves applying voltages of inverted polarities for the sake of suppressing DC image sticking is also called polarity inversion driving. In actuality, even with polarity inversion driving, it is difficult to apply voltages of completely symmetric polarities and thus a resultant image sticking may be perceived as flickering.

Moreover, image sticking will also occur when minute changes in the pretilt angle occur. When the pretilt angle changes, the V-T characteristics are affected, and thus the transmittance will vary even if the same voltage is applied. Since the applied voltage when displaying white is different from the applied voltage when displaying black, the amount of change in the tilt angle will vary depending on the applied voltage. When later entirely switched to the same gray scale level, image sticking may be perceived due to changes in the tilt angle. Such image sticking cannot be suppressed even by performing polarity inversion driving, and is also called AC image sticking.

The present invention has been made in view of the above problems, and an objective thereof is to provide an alignment film which suppresses image sticking caused by changes in the pretilt angle, an alignment film material for forming the aforementioned alignment film, and a liquid crystal display device having the alignment film, as well as methods of forming the same.

Solution to Problem

An alignment film material according to the present invention is an alignment film material comprising: a precursor of a first polyimide; at least one of a second polyimide and a precursor thereof, the second polyimide being different from the first polyimide; and a vinyl-type monomer having a vinyl group, wherein the vinyl-type monomer is represented by general formula (1) P1-A1-(Z1-A2)n-P2 (in general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and Z1 is a —COO— group, a —OCO— group, a —O— group, a —CONH— group or a single bond, where n is 0 or 1).

In one embodiment, the vinyl-type monomer is a bifunctional monomer having a symmetric structure.

In one embodiment, the vinyl-type monomer is a dimethacrylate monomer.

In one embodiment, the vinyl-type monomer is represented by structural formula (1a).

[Formula 1]

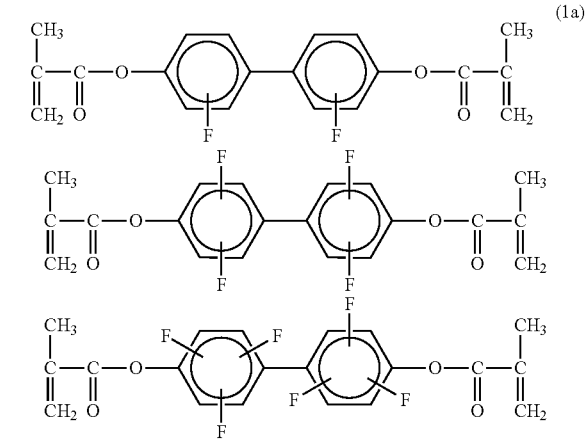

In one embodiment, the precursor of the polyimide is represented by general formula (2).
[Formula 2]
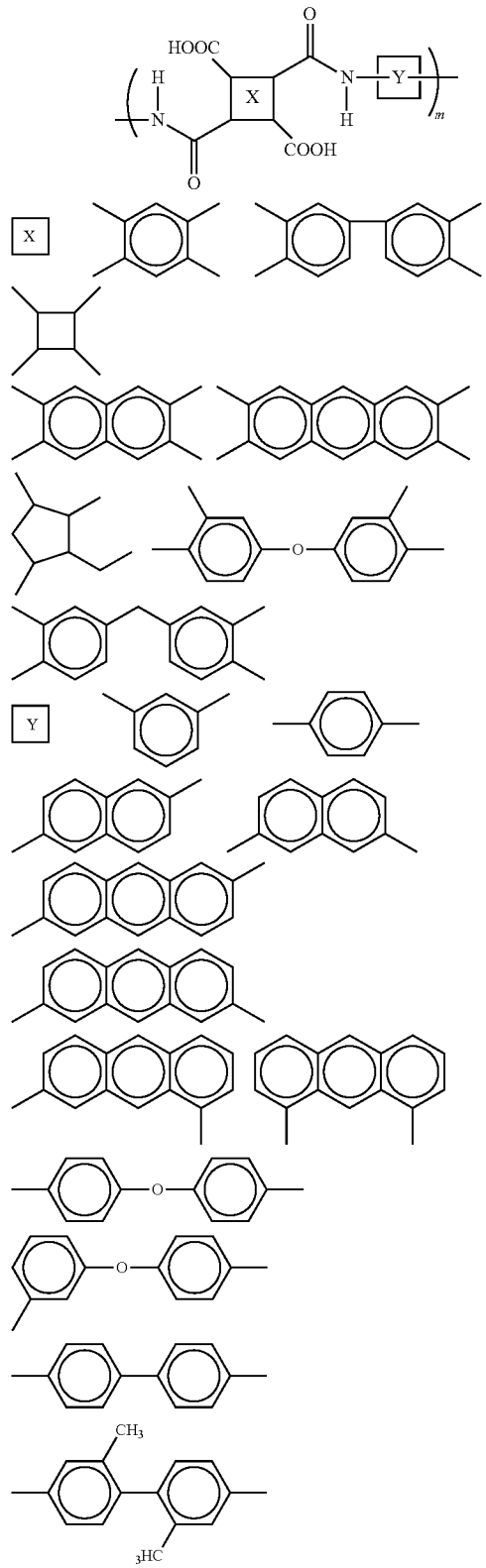
(2)
In one embodiment, a side chain of the precursor of the first polyimide does not have any vertical alignment groups.
In one embodiment, the precursor of the second polyimide is represented by general formula (3); and
[Formula 3]
(3)
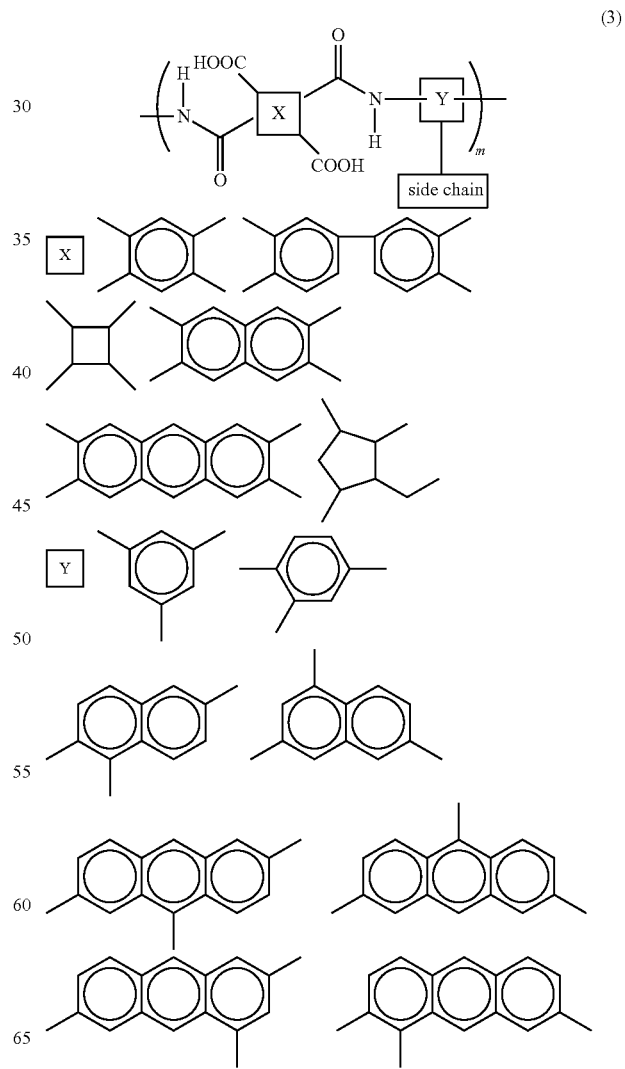

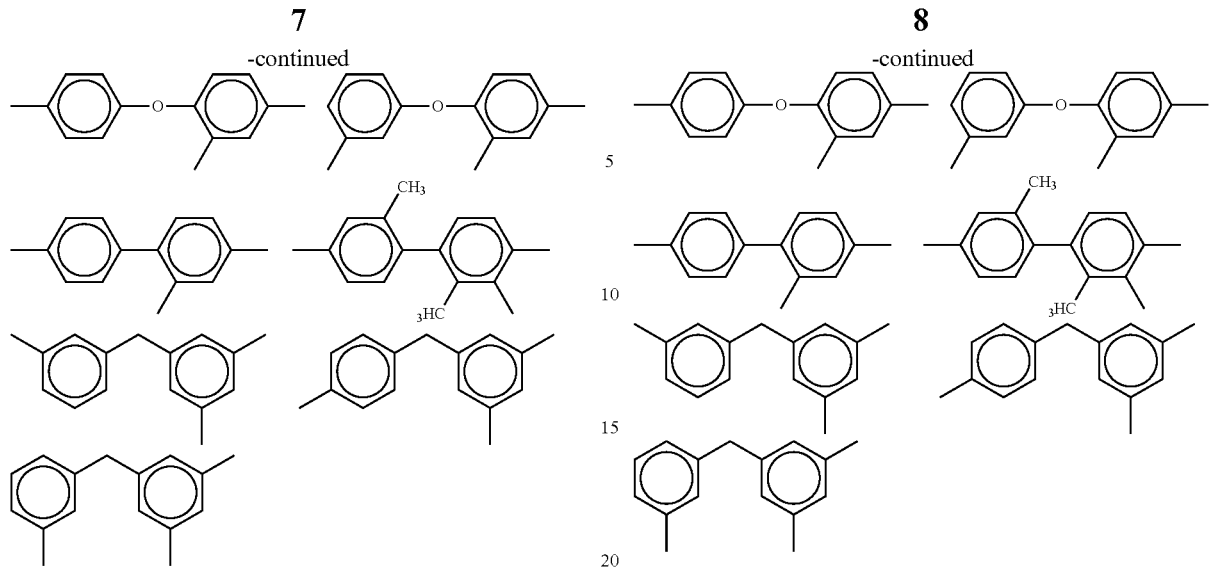

the second polyimide is represented by general formula (3′).

[Formula 4]

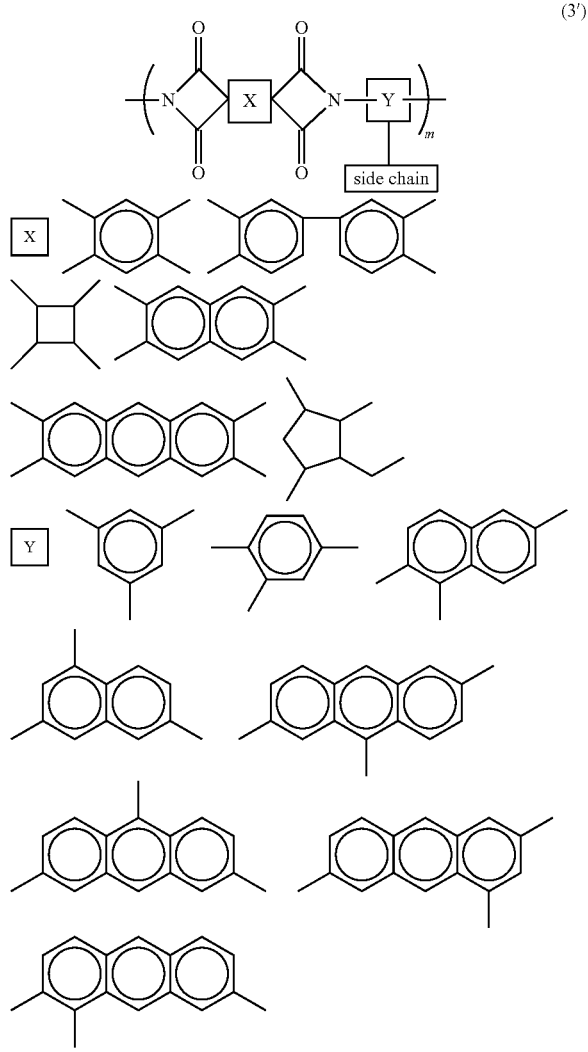

In one embodiment, the second polyimide has a side chain including a fluorine group.

In one embodiment, the second polyimide has a photoreactive functional group.

In one embodiment, the photoreactive functional group is at least one selected from the group consisting of a cinnamate group, a chalcone group, a tolan group, a coumarin group, and an azobenzene group.

In one embodiment, at least one of the second polyimide and the precursor thereof has a side chain represented by general formula (4).

[Formula 5]

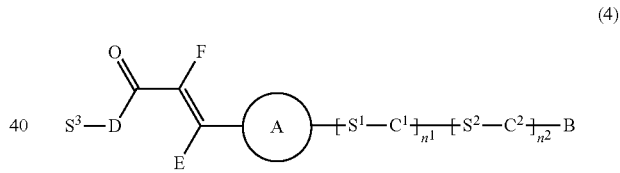

In one embodiment, at least one of the second polyimide and the precursor thereof has a side chain including a vertical alignment group.

In one embodiment, a concentration of the vinyl-type monomer on the basis of the alignment film material is no less than 2 wt % and no more than 20 wt %.

An alignment film according to the present invention is an alignment film comprising: a first polyimide; a second polyimide different from the first polyimide; and a polyvinyl compound resulting from polymerization of a vinyl-type monomer, wherein the vinyl-type monomer is represented by general formula (1) P1-A1-(Z1-A2)n-P2 (in general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and Z1 is a —OCO— group, a —OCO— group, a —O— group, a —CONH— group or a single bond, where n is 0 or 1).

In one embodiment, the alignment film has a first alignment layer containing the first polyimide and a second alignment layer containing the second polyimide.

In one embodiment, the polyvinyl compound is present within the second alignment layer and on a surface of the second alignment layer.

A liquid crystal display device according to the present invention is a liquid crystal display device comprising: an active matrix substrate having a pixel electrode; a counter substrate having a counter electrode; and a vertical-alignment type liquid crystal layer provided between the active matrix substrate and the counter substrate, wherein, at least one of the active matrix substrate and the counter substrate further includes an alignment film provided on the liquid crystal layer side; the alignment film includes a first polyimide, a second polyimide different from the first polyimide, and a polyvinyl compound resulting from polymerization of a vinyl-type monomer; and the vinyl-type monomer is represented by general formula (1) P1-A1-(Z1-A2)n-P2 (in general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and 11 is a —COO— group, a —OCO— group, a —O— group, a —CONH— group or a single bond, where n is 0 or 1).

In one embodiment, the alignment film has a first alignment layer containing the first polyimide and a second alignment layer containing the second polyimide.

In one embodiment, the second alignment layer is provided so as to be closer to the liquid crystal layer than is the first alignment layer; and the polyvinyl compound is present within the second alignment layer and on a surface of the second alignment layer.

In one embodiment, the alignment film regulates liquid crystal molecules in the liquid crystal layer so that the liquid crystal molecules are inclined with respect to a normal direction of a principal face of the alignment film in the absence of an applied voltage.

In one embodiment, the liquid crystal display device has a plurality of pixels; and in each of the plurality of pixels, the liquid crystal layer has a plurality of liquid crystal domains having respectively different reference alignment azimuths.

In one embodiment, the plurality of liquid crystal domains are four liquid crystal domains.

A method of forming an alignment film according to the present invention comprises the steps of: providing an alignment film material containing a precursor of a first polyimide, at least one of a second polyimide and a precursor thereof, and a vinyl-type monomer, the second polyimide being different from the first polyimide; applying the alignment film material; and heating the alignment film material so that at least a portion of the precursor of the first polyimide is imidized into the first polyimide and that the vinyl-type monomer is polymerized to form a polyvinyl compound.

In one embodiment, in the step of providing the alignment film material, the vinyl-type monomer is represented by general formula (1) P1-A1-(Z1-A2)n-P2 (in general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and Z1 is a —COO— group, a —OCO— group, a —O— group, a —CONH— group or a single bond, where n is 0 or 1).

In one embodiment, after the step of heating, a fraction of imide units of the second polyimide is greater than a fraction of imide units of the first polyimide.

In one embodiment, the step of applying the alignment film material comprises a step of performing the application of the alignment film material by a printing technique, an ink jet technique, or a spin coating technique.

Advantageous Effects of Invention

According to the present invention, image sticking caused by changes in the pretilt angle can be suppressed.

DESCRIPTION OF EMBODIMENTS

Hereinafter, with reference to the drawings, an embodiment of an alignment film, alignment film material, and liquid crystal display device having the alignment film according to the present invention will be described.

Figure 1:
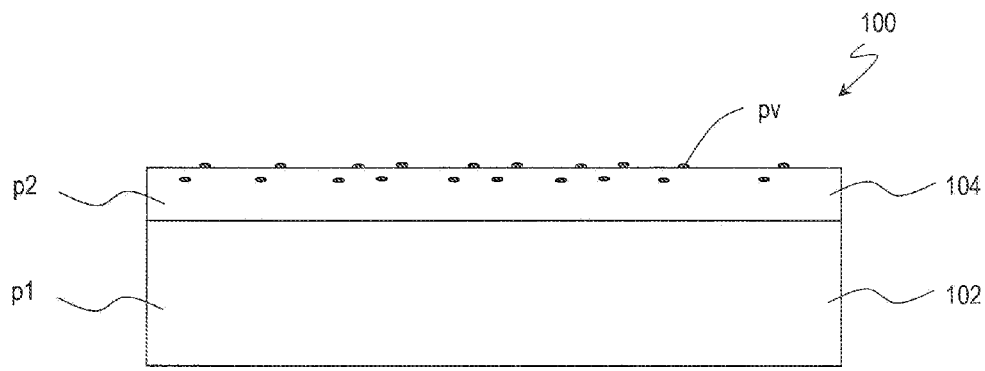
FIG. 1 A schematic cross-sectional view of an embodiment of an alignment film according to the present invention.

FIG. 1 shows a schematic diagram of an alignment film 100 of the present embodiment. The alignment film 100 contains a first polyimide p1, a second polyimide p2, and a polyvinyl compound pv. The alignment film 100 is isolated into the two layers of a first alignment layer 102 containing the first polyimide p1 and a second alignment layer 104 containing the second polyimide p2. The main component of the first alignment layer 102 is the first polyimide p1, whereas the main component of the second alignment layer 104 is the second polyimide p2. The first polyimide p1 is one that has small fluctuations in its electrical characteristics after voltage application. The second polyimide p2 is one that leads to greatly varying pretilt angles of liquid crystal molecules depending on the alignment treatment.

The second alignment layer 104 is located on an upper side of the first alignment layer 102. Generally speaking, the second alignment layer 104 is thinner than the first alignment layer 102. Moreover, the alignment film 100 does not need to be completely isolated into two layers as illustrated.

In the alignment film 100, the main chains of the first and second polyimides p1 and p2 align in essentially one direction. The main chain or the side chain of the second polyimide p2 may have a photoreactive functional group. The photoreactive functional group may be one of a cinnamate group, a chalcone group, a tolan group, a coumarin group, and an azobenzene group, for example. Alternatively, the side chain of the second polyimide p2 may have a vertical alignment group. The first and second polyimides p1 and p2 are formed through imidization (polymerization) of different polyimide precursors.

The polyvinyl compound pv of the alignment film 100 of the present embodiment has a fluorine group, such that the polyvinyl compound pv is formed through polymerization of a vinyl-type monomer having a fluorine group. The polyvinyl compound pv is present within the second alignment layer 104 and on the surface of the second alignment layer 104. The polymerization is performed by applying heat or light to the vinyl-type monomer.

The alignment film 100 is formed as follows. First, an alignment film material is provided. The alignment film material is obtained by allowing the precursor of the first polyimide p1, at least one of the second polyimide p2 and the precursor thereof, and a vinyl-type monomer having a fluorine group to be dissolved in a solvent. The concentration of the vinyl-type monomer on the basis of the alignment film material is no less than 2 wt % and no more than 20 wt %.

The fraction of imide units of the second polyimide p2 in the alignment film material may be between 0% and 100%. It is considered that, the lower the fraction of imide units of the first polyimide p1 is, the higher the effect of suppressing residual DC voltage is.

In the alignment film material, it is preferable that the fraction of imide units of the second polyimide p2 is higher than the fraction of imide units of the first polyimide p1. For example, a precursor of a polyimide for horizontal alignment having a fraction of imide units of 0%, and a polyimide for vertical alignment having a fraction of imide units which is higher than 0% and its precursor may be provided, and these may be dissolved in a solvent; and furthermore, a vinyl-type monomer having a fluorine group may be dissolved in the solvent. Note that the concentration of the second polyimide and the precursor thereof is lower than the concentration of the precursor of the first polyimide.

Application of the alignment film material is performed by a printing technique, an ink jet technique, or a spin coating technique. Next, the solvent is removed from the alignment film material. For example, the solvent is removed through a heat treatment. The heat treatment also allows the precursor of the first polyimide p1 to imidize into the first polyimide p1 and the precursor of the second polyimide p2 to imidize into the second polyimide p2. At this time, isolation into the two layers occurs, such that the first alignment layer 102 containing the first polyimide p1 and the second alignment layer 104 containing the second polyimide p2 are formed. Note that, it is preferable also in the alignment film 100 that the fraction of imide units of the second polyimide p2 is higher than the fraction of imide units of the first polyimide p1.

Moreover, the heat treatment allows the vinyl-type monomer to polymerize, whereby the polyvinyl compound pv is formed. Since the vinyl-type monomer has a fluorine group, due to surface tension of the fluorine group, the polyvinyl compound pv is formed within the second alignment layer 104 and on the surface of the second alignment layer 104. Thus, since the polyvinyl compound pv is present on the surface of the alignment film 100 and the neighborhood thereof, changes in the pretilt angle of the liquid crystal molecules can be efficiently suppressed.

Herein, the vinyl-type monomer is a polyfunctional monomer having a plurality of vinyl groups ($CH_2=CH-$), and the polyvinyl compound pv is a polymerization product of the polyfunctional monomer. For example, the polyfunctional monomer is dimethacrylate, diacrylate, diacrylamide, or dimethacrylamide. The vinyl groups of such a polyfunctional monomer are parts of methacrylate groups, acrylate groups, acrylamide groups, or methacrylamide groups, for example.

The vinyl-type monomer is represented by general formula (1).

$$P1-A1-(Z1-A2)n-P2 \qquad (1)$$

In general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and Z1 is a —OCO— group, a —OCO— group, a —O— group, a —CONH— group or a single bond, where n is 0 or 1.

Thus, since the polyfunctional monomer has a plurality of vinyl groups, the polyvinyl compound pv which is formed through polymerization of the polyfunctional monomer has a three-dimensional network structure. Moreover, this polyfunctional monomer has two or more directly-bonded ring structures or one or more condensed ring structures between the plurality of vinyl groups, and has a low degree of freedom with respect to deformation, such that the polyvinyl compound is unlikely to deform under stress. By containing the polyvinyl compound pv as such, the alignment film 100 is structurally stabilized, whereby fluctuations of the alignment characteristics are suppressed.

Moreover, in the present embodiment, formation of the two alignment layers 102 and 104 is performed altogether at one time, via application of an alignment film material obtained by mixing different polyimide precursors and a heat treatment. As a result, the processing steps and time for forming the alignment film 100 can be abbreviated.

Figure 2:
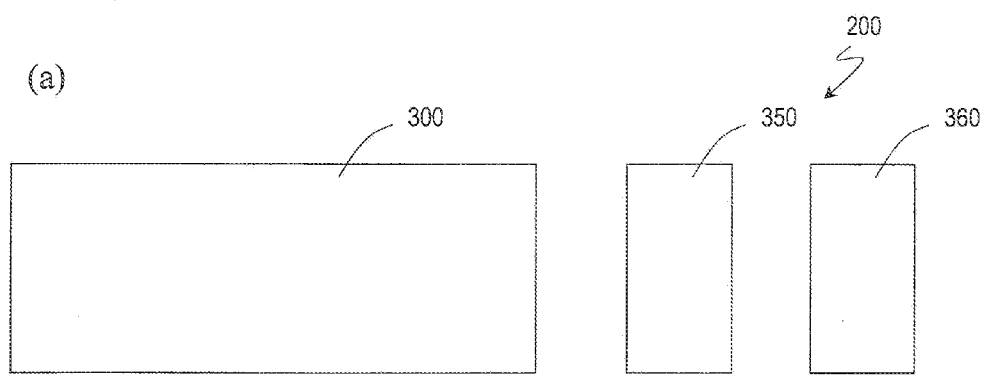
FIG. 2(a) is a schematic diagram of an embodiment of a liquid crystal display device according to the present invention; and (b) is a schematic diagram of a liquid crystal panel of the liquid crystal display device of the present embodiment.
Figure 2:
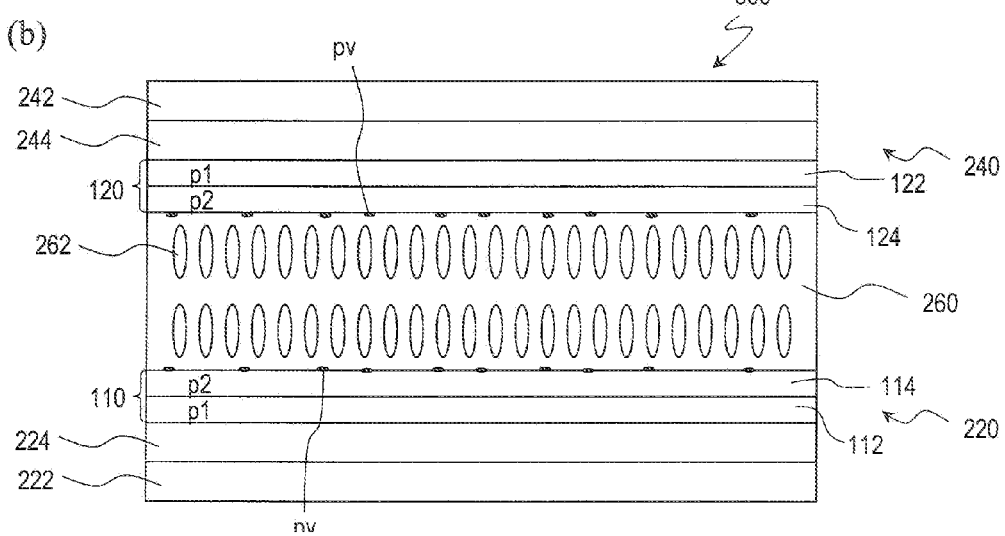

Hereinafter, with reference to FIG. 2, a liquid crystal display device 200 having alignment films 110 and 120 according to the present embodiment will be described. FIG. 2(a) shows a schematic diagram of the liquid crystal display device 200. The liquid crystal display device 200 includes a liquid crystal panel 300, a driving circuit 350 for driving the liquid crystal panel 300, and a control circuit 360 for controlling the driving circuit 350. Although not shown, the liquid crystal display device 200 may include a backlight as necessary.

As shown in FIG. 2(b), the liquid crystal panel 300 includes an active matrix substrate 220 having the first alignment film 110, a counter substrate 240 having the second alignment film 120, and a liquid crystal layer 260 provided between the active matrix substrate 220 and the counter substrate 240. The active matrix substrate 220 further includes a first insulative substrate 222 and pixel electrodes 224, such that the first alignment film 110 covers the pixel electrodes 224. Moreover, the counter substrate 240 further includes a second insulative substrate 242 and a counter electrode 244, such that the second alignment film 120 covers the counter electrode 244. The liquid crystal layer 260 is interposed between the active matrix substrate 220 and the counter substrate 240. For example, the first and the second insulative substrates 222 and 242 are transparent glass substrates.

The liquid crystal display device 200 includes pixels composing a matrix of a plurality of rows and a plurality of columns. On the active matrix substrate 220, at least one switching element (e.g., thin film transistor (Thin Film Transistor: TFT)) (not shown in the figure) is provided for each pixel, and the active matrix substrate 220 is also referred to a TFT substrate. In the present specification, a "pixel" refers to the smallest unit that expresses a specific gray scale level in displaying; in the case of multicolor displaying, a "pixel" corresponds to a unit that expresses a gray scale level of each of R, G, and B, for example, and is also referred to as a dot. A combination of an R pixel, a G pixel, and a B pixel composes a single color displaying pixel. A "pixel region" refers to a region of the liquid crystal panel 300 that corresponds to a "pixel" in displaying.

Although not shown, a polarizer is provided on each of the active matrix substrate 220 and the counter substrate 240. Therefore, the two polarizers are disposed so as to oppose each other with the liquid crystal layer 260 interposed therebetween. The transmission axes (polarization axes) of the two polarizers are positioned so as to be orthogonal to each other, such that one of them extends along the horizontal direction (row direction), whereas the other extends along the vertical direction (column direction).

The first alignment film 110 contains the first polyimide p1, the second polyimide p2, and the polyvinyl compound pv. The first alignment film 110 is isolated into the two layers of the first alignment layer 112 containing the first polyimide p1 and the second alignment layer 114 containing the second polyimide p2. The second alignment layer 114 is located on the liquid crystal layer 260 side of the first alignment layer 112.

Similarly, the second alignment film 120 contains the first polyimide p1, the second polyimide p2, and the polyvinyl compound pv, and the second alignment film 120 is isolated into the two layers of a first alignment layer 122 containing the first polyimide p1 and a second alignment layer 124 containing the second polyimide p2. The second alignment layer 124 is located on the liquid crystal layer 260 side of the first alignment layer 122.

The first polyimide p1 is formed by imidizing the precursor thereof. Also, the second polyimide p2 is formed by imidizing the precursor thereof. The polyvinyl compound pv is formed through polymerization of a vinyl-type monomer. The polymerization is performed by applying heat or light to the vinyl-type monomer.

The first alignment film 110 is made of an alignment film material. The alignment film material is obtained by allowing the precursor of the first polyimide p1, the second polyimide p2 and/or the precursor thereof, and the vinyl-type monomer to be dissolved in a solvent, for example. For example, after applying the alignment film material onto the pixel electrodes 224, a heat treatment is performed to evaporate the solvent and effect imidization and polymerization, whereby the first alignment film 110 containing the first polyimide p1, the second polyimide p2, and the polyvinyl compound pv is formed. The heat treatment is performed twice at different temperatures, for example. Similarly, after applying the alignment film material onto the counter electrode 244, a heat treatment is performed to evaporate the solvent and effect imidization and polymerization, whereby the second alignment film 120 containing the first polyimide p1, the second polyimide p2, and the polyvinyl compound pv is formed.

The liquid crystal layer 260 contains a nematic liquid crystal material (liquid crystal molecules 262) having negative dielectric anisotropy. The first alignment film 110 and the second alignment film 120 are each treated so that the pretilt angle of the liquid crystal molecules 262 is less than 90° with respect to the surface of the vertical alignment film. The pretilt angle of the liquid crystal molecules 262 is an angle between principal faces of the first alignment film 110 and the second alignment film 120 and the major axis of each liquid crystal molecule 262 that is regulated in a pretilt direction.

Although the liquid crystal layer 260 is of a vertical-alignment type, due to the second alignment layers 114 and 124 containing the second polyimide p2, the liquid crystal molecules 262 in their neighborhood are slightly inclined from the normal directions of the principal faces of the first and second alignment films 110 and 120. The pretilt angle is within a range from 85° to 89.7°, for example. The pretilt angle is measured by a crystal rotation technique, for example. The side chain of the second polyimide p2 defines the pretilt direction of the liquid crystal molecules 262. In the following description, this component may also be referred to as a pretilt-angle-exhibiting component.

Note that the pretilt azimuth of the liquid crystal molecules 262 introduced by the first alignment film 110 is different from the pretilt azimuth of the liquid crystal molecules 262 introduced by the second alignment film 120. For example, the pretilt azimuth of the liquid crystal molecules 262 introduced by the first alignment film 110 intersects, at 90°, the pretilt azimuth of the liquid crystal molecules 262 introduced by the second alignment film 120. Herein, no chiral agent is added to the liquid crystal layer 260, so that, when a voltage is applied across the liquid crystal layer 260, the liquid crystal molecules within the liquid crystal layer 260 take a twist alignment in accordance with the alignment regulating forces from the first and second alignment films 110 and 120. However, a chiral agent may be added to the liquid crystal layer 260 as necessary. In combination with polarizers which are placed in crossed Nicols, the liquid crystal layer 260 performs displaying in a normally black mode.

Moreover, each of the first and second alignment films 110 and 120 may have a plurality of alignment regions for each pixel. For example, a portion of the first alignment film 110 may be masked, and after a predetermined region of the first alignment film 110 is irradiated with light from a certain direction, another region which was not irradiated with light may be irradiated with light from a different direction. Furthermore, the second alignment film 120 may be similarly formed. In this manner, regions that confer different alignment regulating forces can be formed in each of the first and second alignment films 110 and 120.

For example, the first polyimide p1 is represented by general formula (2').

[Formula 6]

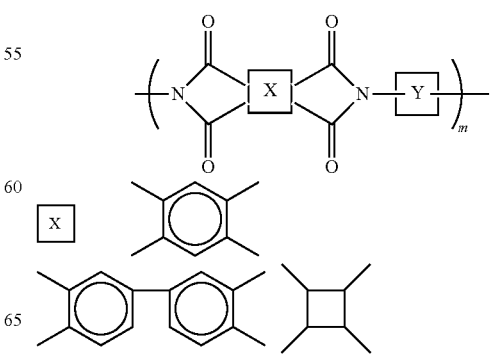

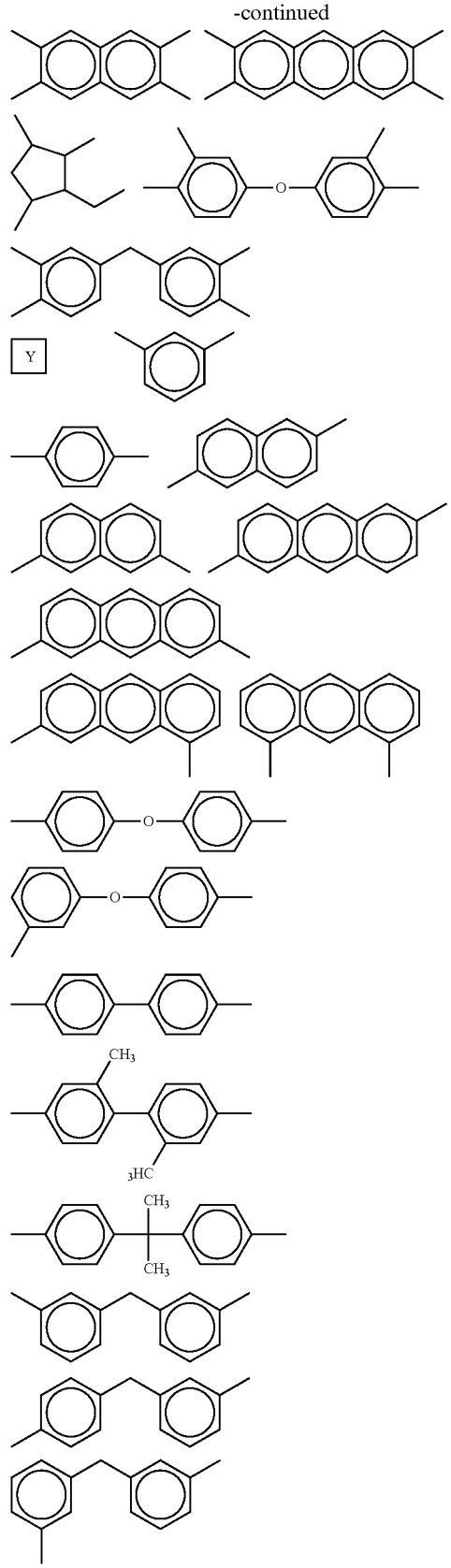
More specifically, the first polyimide p1 is represented by structural formula (2a').
[Formula 7]
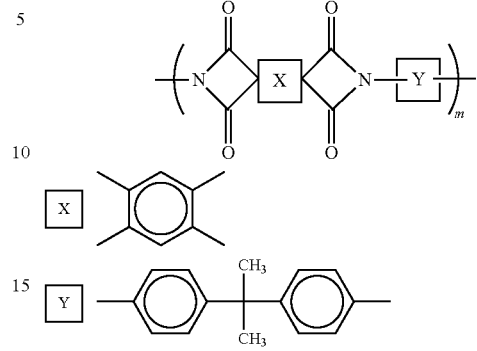
For example, the second polyimide p2 is represented by general formula (3').
[Formula 8]
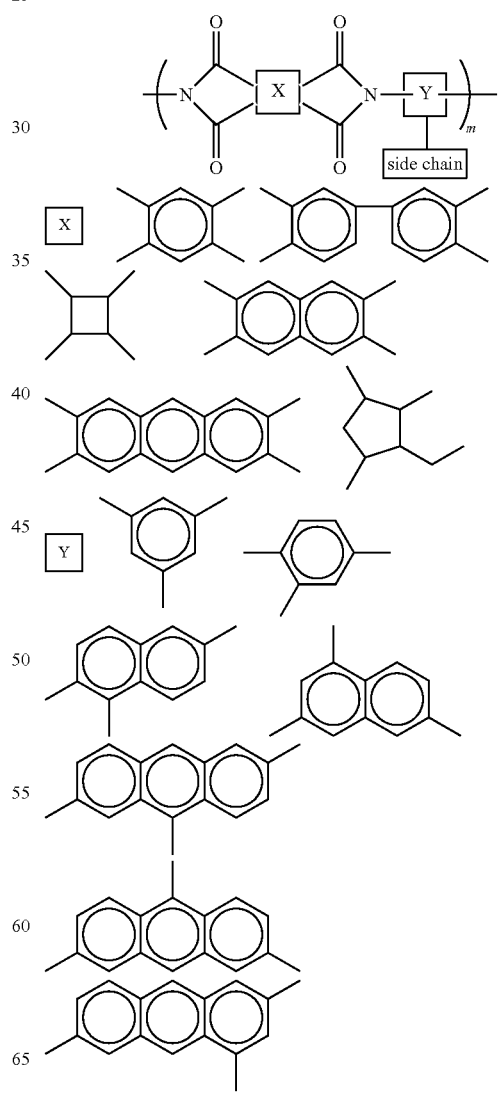

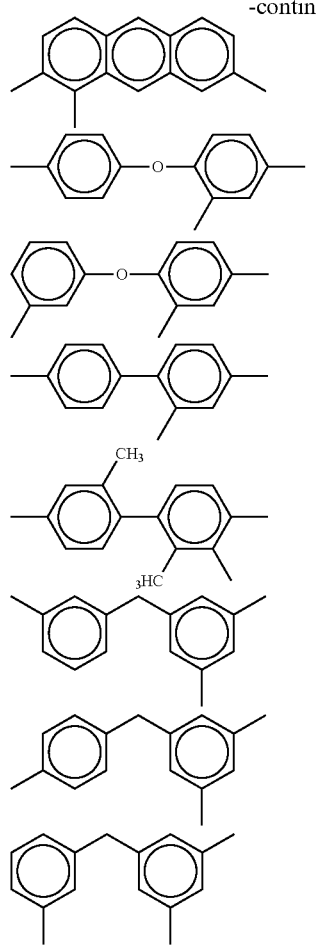

Note that the side chain of the second polyimide p2 may contain a fluorine atom. When the side chain contains a fluorine atom, the aforementioned image sticking is suppressed to a certain extent.

Moreover, the second polyimide p2 may contain a photoreactive functional group. In this case, a dimerization site is formed through light irradiation. The second alignment layers 114 and 124 containing the second polyimide p2 as such may also be referred to as a photo-alignment layer. For example, the second polyimide p2 may have photoreactive functional group in its side chain, and the side chain of the second polyimide p2 is represented by general formula (4).

[Formula 9]

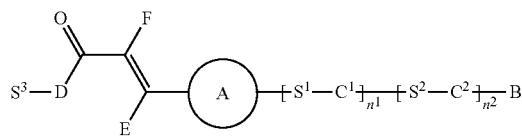

Herein, A represents pyrimidine-2,5-diyl, pyridine-2,5-diyl, 2,5-thiophenylene, 2,5-furanylene, 1,4- or 2,6-naphthylene, or phenylene, optionally substituted by a group selected from fluorine, chlorine, and cyano, or by a $C_{1-18}$ cyclic, linear chain, or branched alkyl residue (which is optionally substituted by one cyano group or one or more halogen atoms, where one or more non-adjacent —$CH_2$— groups of the alkyl are optionally replaced by a group Q).

B is a linear or branched alkyl residue which is unsubstituted, mono-substituted by cyano or halogen, or poly-substituted by halogen, having 3 to 18 carbon atoms (where one or more non-adjacent $CH_2$ groups may independently be replaced by a group Q).

$C^1$ and $C^2$ each independently of the other represent an aromatic or alicyclic group (which is unsubstituted or substituted by fluorine, chlorine, cyano, or by a cyclic, linear, or branched alkyl residue (which is unsubstituted, mono-substituted by cyano or halogen, or poly-substituted by halogen, having 1 to 18 carbon atoms and where one or more non-adjacent $CH_2$ groups may independently be replaced by a group Q)). D represents an oxygen atom or $NR^1$— (where $R^1$ represents a hydrogen atom or lower alkyl).

$S^1$ and $S^2$ each independently of the other represent a single covalent bond or a spacer unit. $S^3$ represents a spacer unit.

Q represents a group selected from —O—, —CO—, —CO—O—, —O—CO—, —Si(CH$_3$)$_2$—O—Si(CH$_3$)$_2$—, —$NR^1$—, —$NR^1$—CO—, —CO—$NR^1$—, —$NR^1$—CO—O—, —O—CO—$NR^1$—, —$NR^1$—CO—$NR^1$—, —CH═CH—, —C≡C—, and —O—CO—O— (where $R^1$ represents a hydrogen atom or lower alkyl). E and F each independently of the other represent hydrogen, fluorine, chlorine, cyano, alkyl optionally substituted by fluorine having carbon atoms 1 to 12 (where optionally one or more non-adjacent $CH_2$ groups are replaced by —O—, —CO—O—, —O—CO— and/or —CH═CH—).

Note that it is preferable that A includes an aromatic compound; B includes fluorocarbon; D includes at least one or more hydrocarbon groups; and E and F include hydrogen atoms.

Specifically, the second polyimide p2 is represented by structural formula (3a').

[Formula 10]

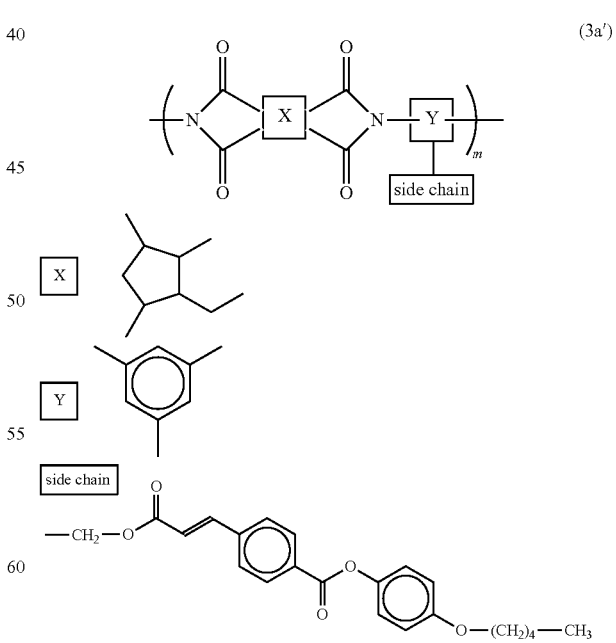

In this case, by irradiating the first or second alignment film 110, 120 with light from an oblique direction with respect to the normal direction of its principal face, an alignment regulating force is applied to the second polyimide p2 such that the liquid crystal molecules 262 are aligned so as to be inclined from the normal directions of the principal faces of the first and second alignment films 110 and 120 in the absence of an applied voltage. The second polyimide p2 represented by structural formula (3a') is also referred to as a photo-alignable polyimide, and such a treatment is also referred to as a photo-alignment treatment. Since a photo-alignment treatment is performed without involving any contact, static electricity will not occur due to friction as in a rubbing treatment, and thus the production yield can be improved.

Although the above description illustrates that the second polyimide p2 has a photoreactive functional group, and that a photo-alignment treatment is performed as an alignment treatment, the present invention is not limited thereto. The side chain of the second polyimide p2 may have a vertical alignment group, and a rubbing treatment or an ion beam irradiation may be performed as an alignment treatment. For example, the second polyimide p2 may be represented by structural formula (3b').

[Formula 11]

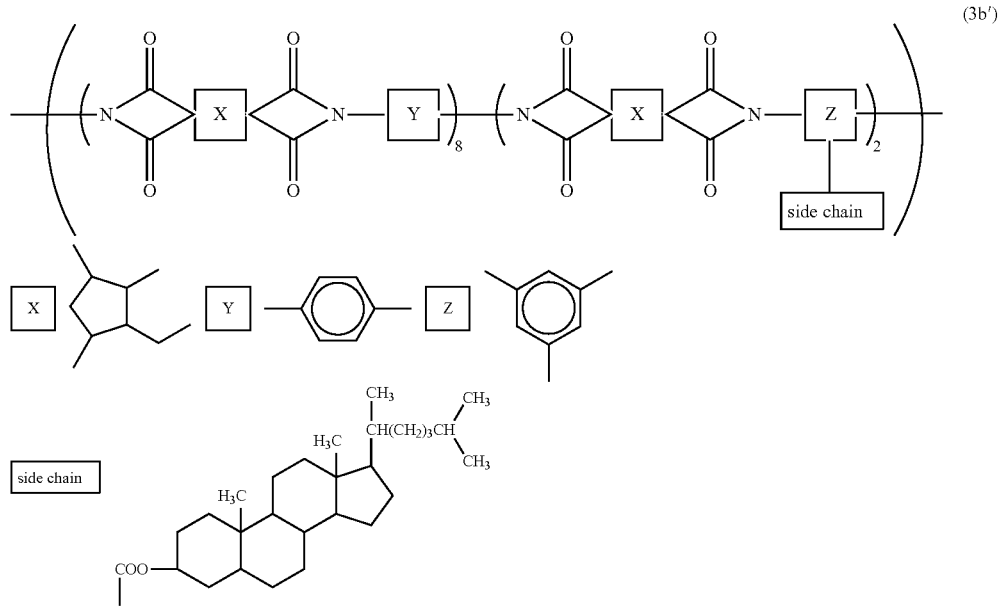

The second polyimide p2 has a side chain including a vertical alignment group, and the second polyimide p2 is also referred to as a vertical-alignment type polyimide. After forming the first and second alignment films 110 and 120, the first and second alignment films 110 and 120 may be subjected to a rubbing treatment or an ion beam irradiation, whereby a pretilt can be conferred to the liquid crystal molecules 262.

The polyvinyl compound pv is obtained by polymerizing a vinyl-type monomer. The vinyl-type monomer is represented by general formula (1).

$$P1-A1-(Z1-A2)n-P2 \qquad (1)$$

In general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and Z1 is a —OCO— group, a —OCO— group, a —O— group, a —CONH— group or a single bond, where n is 0 or 1.

The vinyl-type monomer is represented by structural formula (1a), for example.

[Formula 12]

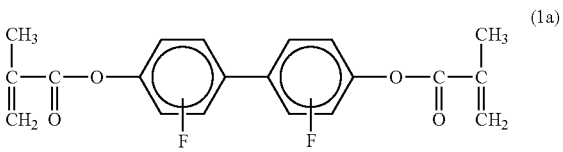

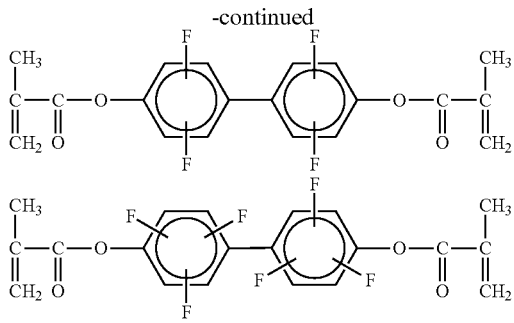

The vinyl-type monomer represented by structural formula (1a) is biphenyldimethacrylate. The main chain of the vinyl-type monomer may have two ring structures, and each of the two ring structures may be substituted by a fluorine group. Alternatively, one ring structure may have one, two, or three fluorine groups. Moreover, it is preferable that the vinyl-type monomer is a bifunctional monomer having a symmetric structure.

Note that both of the second polyimide p2 and the polyvinyl compound pv are present in the interior and on the surface of the second alignment layer 114 of the first alignment film 110. However, on the first alignment layer 112, the first polyimide p1 is present, but not the polyvinyl compound pv. Similarly, both of the second polyimide p2 and the polyvinyl compound pv are present in the interior and on the surface of the second alignment layer 124 of the second alignment film 120. However, on the first alignment layer 122, the first polyimide p1 is present, but not the polyvinyl compound pv.

Thus, since the polyvinyl compound pv is present on the surface of the first and second alignment films 110 and 120 as well as the neighborhood thereof, the first and second alignment films 110 and 120 are structurally stabilized; changes in the alignment function are suppressed; and the pretilt angle of the liquid crystal molecules 262 in the liquid crystal layer 260 is maintained. When the vinyl-type monomer is a monofunctional monomer, the resultant polymerization product, i.e., a long linear polymer, is liable to deformation, and therefore changes in the alignment function cannot be sufficiently suppressed. On the other hand, when the vinyl-type monomer is a polyfunctional monomer, its polymerization product can sufficiently suppress changes in the alignment function. Note that the alignment films 110 and 120 contain not only the polyvinyl compound pv but also the polyimides p1 and p2, and thus the thermal resistance, solvent resistance, hygroscopicity, and other characteristics of the alignment films 110 and 120 are not substantially deteriorated as compared to those of a generic alignment film which is made only of polyimide.

The concentration of the polyvinyl compound pv is much higher at the surface of the first and second alignment films 110 and 120 than in the interior of the first and second alignment films 110 and 120. The concentration of the polyvinyl compound pv is measured by, for example, time of flight-secondary ion mass spectrometry (TOF-SIMS) or X-ray photoelectron spectroscopy (XPS). In the case of XPS, for example, an apparatus manufactured by ULVAC-PHI, INCORPORATED may be used to analyze the atoms in the depth direction while etching with C60.

As mentioned earlier, since the vinyl-type monomer has a fluorine group, due to surface tension of the fluorine group, the polyvinyl compound pv is present on the surface of the second alignment layers 114 and 124 as well as the neighborhood thereof. Thus, since the polyvinyl compound pv is present on the surface of the first and second alignment films 110 and 120 as well as the neighborhood thereof, changes in the pretilt angle of the liquid crystal molecules 262 can be efficiently suppressed.

In the case where the side chain of the second polyimide and its precursor includes a fluorine group, the amount of polyvinyl compound that is formed on the surface of the first and second alignment films as well as the neighborhood thereof would be considerably reduced if the vinyl-type monomer did not have a fluorine group, due to low surface tension. However, since the vinyl-type monomer has a fluorine group, the polyvinyl compound pv is formed at the surface of the first and second alignment films 110 and 120 even if the side chain of the second polyimide and its precursor includes a fluorine group. Note that, while the side chain of the second polyimide may have a fluorine group, preferably the fluorine group in the side chain of the second polyimide is as little as possible, from the standpoint of suppressing changes in the pretilt angle.

As another technique of suppressing image sticking caused by changes in the pretilt angle, Polymer Sustained Alignment Technology (hereinafter referred to as "PSA technique") is known. In the PSA technique, the pretilt direction of the liquid crystal molecules is controlled by a polymerization product that is generated by radiating the polymerizable compound with an active energy ray (e.g., ultraviolet light) while applying a voltage across a liquid crystal layer in which a small amount of polymerizable compound (e.g., a photopolymerizable monomer) is mixed.

Now, differences between an alignment sustaining layer which is formed by a generic PSA technique and the polyvinyl compound pv in the alignment films 110 and 120 of the liquid crystal display device 200 of the present embodiment will be described.

In the PSA technique, the alignment sustaining layer exists on the alignment film, and when the liquid crystal panel is disassembled to analyze the surface of the active matrix substrate or the counter substrate by TOF-SIMS or XPS, ions or atoms derived from the polymerizable component will be detected at the outermost surface of the substrate. On the other hand, in the display device 200 of the present embodiment, the polyvinyl compound pv is contained in the alignment films 110 and 120, and when the liquid crystal panel is disassembled to similarly analyze the surface of the active matrix substrate 220 or the counter substrate 240, not only ions or atoms derived from the polyvinyl compound pv but also ions or atoms derived from the second polyimide p2 of the second alignment layers 114 and 124 will be detected, indicative that the second polyimide p2 and the polyvinyl compound pv are present at the surface of the active matrix substrate 220, and also that the second polyimide p2 and the polyvinyl compound pv are present at the surface of the counter substrate 240.

Moreover, in the PSA technique, polymerization product is formed through light irradiation after producing a liquid crystal panel having an alignment film, whereas in the liquid crystal display device 200 of the present embodiment, the polyvinyl compound pv is contained in the first and second alignment films 110 and 120, and the polyvinyl compound pv is formed before the active matrix substrate 220 and the counter substrate 240 are attached together. Therefore, even if the active matrix substrate 220 and the counter substrate 240 is to be attached together in a different place from the place where the active matrix substrate 220 and the counter substrate 240 were produced, there is no need to effect formation of the polyvinyl compound at the place where they are attached together, thus facilitating the production of the liquid crystal display device 200.

Moreover, in the PSA technique, the voltage holding ratio will be lowered if any unreacted monomer remains in the liquid crystal layer. Therefore, in the PSA technique, ultraviolet irradiation must be performed for a long time in order to reduce the remaining monomer. On the other hand, in the liquid crystal display device 200 of the present embodiment, a polymerization product for suppressing changes in the pretilt angle is formed in the alignment films, thus suppressing lowering of the voltage holding ratio and making it possible to omit irradiation ultraviolet over a long time.

In the liquid crystal display device 200 of the present embodiment, as described above, the alignment films 110 and 120 contain the polyvinyl compound pv, which fixes the pretilt direction of the liquid crystal molecules 262. This is presumably because the polyvinyl compound pv suppresses deformation of the pretilt-angle-exhibiting component, whereby the alignment direction of the liquid crystal molecules 262 introduced by the second polyimide p2 is maintained in a direction which is essentially vertical to the principal faces of the alignment films 110 and 120. Moreover, the polyvinyl compound pv stabilizes the impurities and the like which have occurred due to damage during the alignment treatment, thus suppressing generation of impurity ions and occurrence of image sticking.

In the liquid crystal display device 200 of the present embodiment, the vinyl-type monomer represented by general formula (1) above is introduced in the alignment film material, and film formation is conducted with a usual method, as a result of which the polyvinyl compound pv occurring through polymerization of the vinyl-type monomer exists on the liquid crystal layer 260 side of the first and second alignment films 110 and 120. Therefore, the pretilt angle of the liquid crystal molecules 262 can be stabilized, and it is possible to maintain a high voltage holding ratio and a low residual DC voltage, thereby preventing image sticking. Since there is no need to perform photopolymerization after introducing the liquid crystal material unlike in the PSA technique, production with simple steps is possible, and the problem of a lowered voltage holding ratio due to any monomer remaining in the liquid crystal material is prevented.

Figure 3:
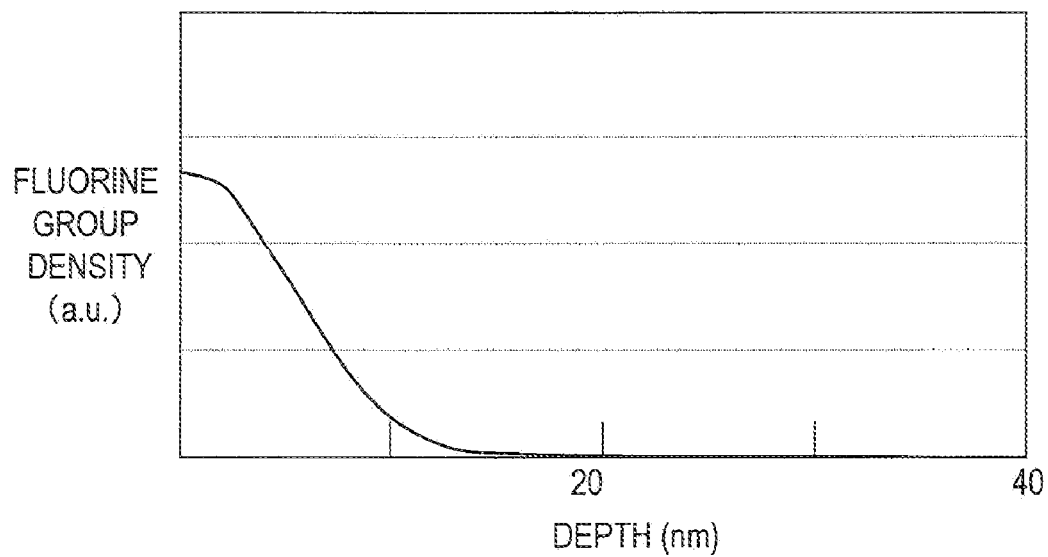
FIG. 3 A graph showing a relationship between the thickness of an alignment layer and the density of a fluorine group existing in the side chain of polyimide.

For reference sake, a result of taking an X-ray photoelectron spectroscopy (X-ray Photoelectron Spectroscopy: XPS) measurement of an alignment film formed by using an alignment film material in which the first polyimide and the second polyimide having a fluorine group in its side chain were mixed, without adding any vinyl monomer thereto, is shown in FIG. 3. Since the fluorine group is present near the surface within the alignment film, it is understood that the second polyimide is present at the alignment film surface, more so than is the first polyimide.

From the standpoint of suppressing residual DC voltage, it is preferable that the alignment films 110 and 120 have a high resistance. The reason is that, if the alignment films 110 and 120 have a high resistance, the voltage applied to the alignment films 110 and 120 increases relative to the voltage between the pixel electrodes 224 and the counter electrode 244, whereby the voltage applied across the liquid crystal layer 260 decreases, and the concentration of impurities accumulated at the interfaces between the liquid crystal layer 260 and alignment films 110 and 120 decreases. In the alignment films 110 and 120, it is particularly preferable that the first alignment layers 112 and 122, which mainly contribute to suppression of residual DC voltage in particular, have a high resistance.

Hereinafter, with reference to FIG. 4, a production method for the liquid crystal display device 200 will be described.

Figure 4:
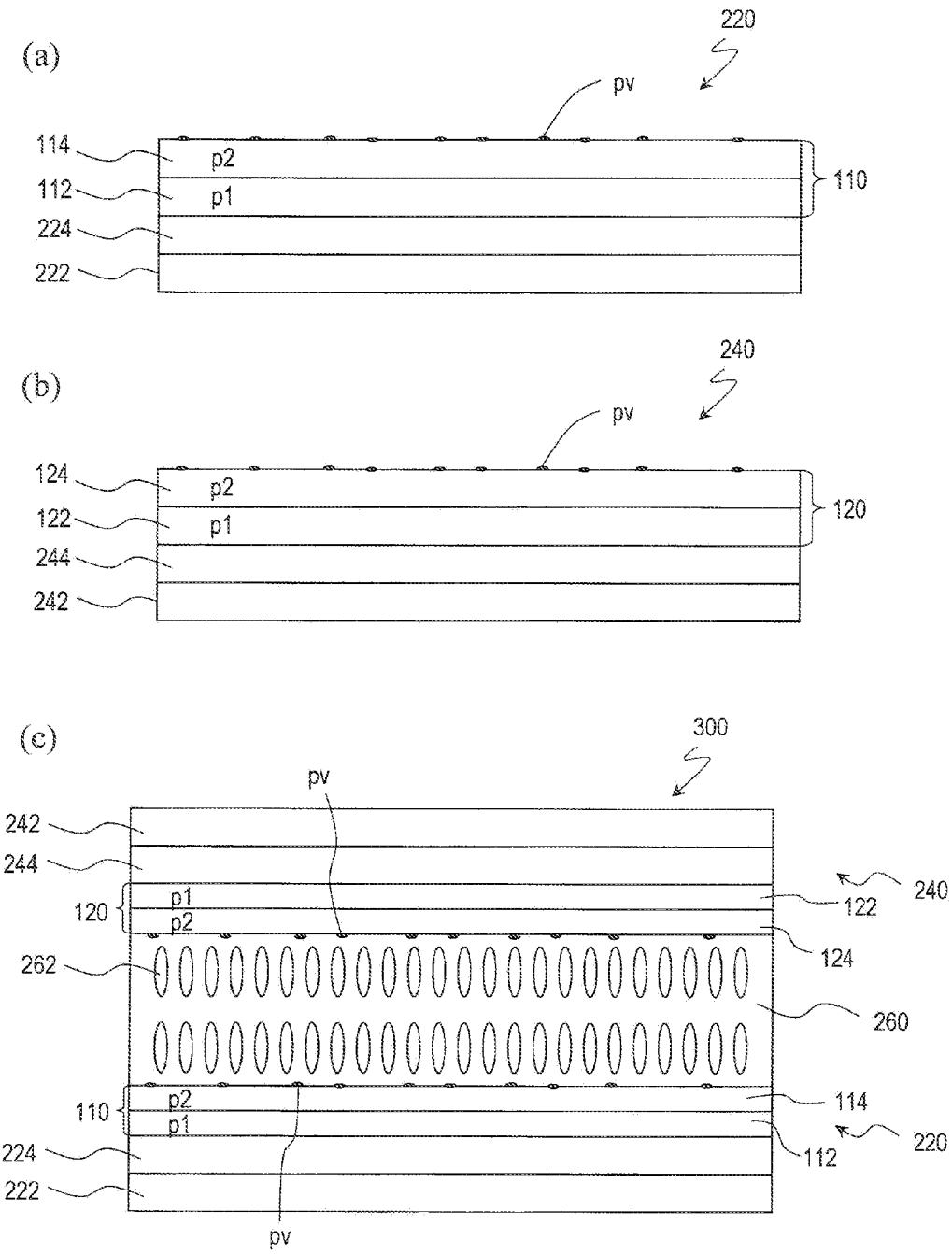
FIG. 4(a) to (c) are schematic diagrams each illustrating a production method of the liquid crystal display device of the present embodiment.

First, as shown in FIG. 4(*a*), the pixel electrodes 224 are formed on the first insulative substrate 222. Although not shown in FIG. 4(*a*), TFTs and wiring lines and the like that are connected thereto are provided between the first insulative substrate 222 and the pixel electrodes 224. Next, the first alignment film 110 covering the pixel electrodes 224 is formed.

Formation of the first alignment film 110 is performed as follows. First, an alignment film material is prepared. The alignment film material is obtained (as a mixture) by allowing the precursor of the first polyimide p1 and at least one of the second polyimide p2 and the precursor thereof, and the vinyl-type monomer to be dissolved in a solvent.

For example, the precursor of the first polyimide p1 is represented by general formula (2).

[Formula 13]

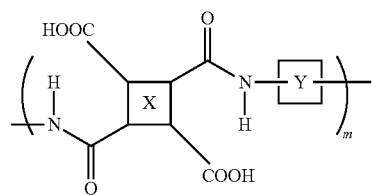

(2)

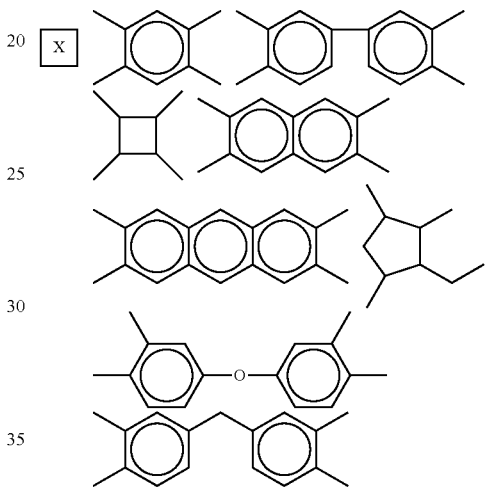

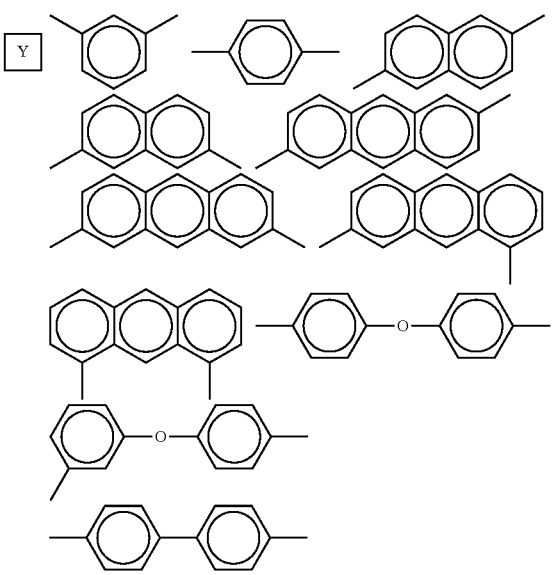

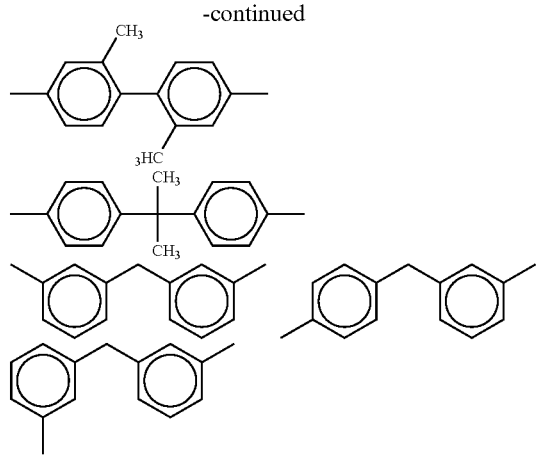
More specifically, the precursor of the first polyimide p1 is represented by structural formula (2a).
[Formula 14]
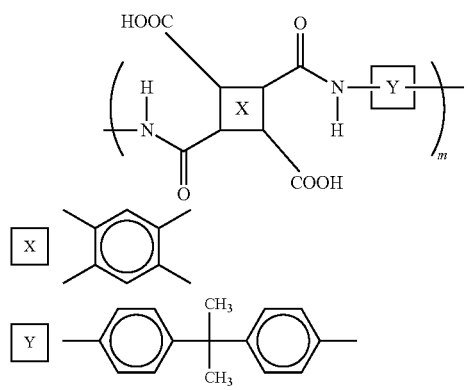
For example, the second polyimide p2 is represented by general formula (3').
[Formula 15]
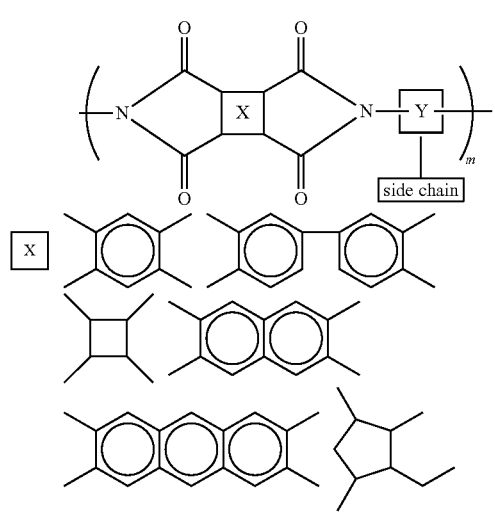
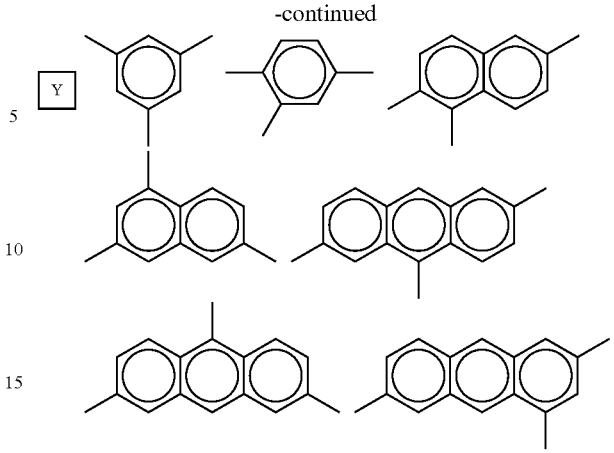
The precursor (polyamic acid) of the second polyimide p2 is represented by general formula (3).
[Formula 16]
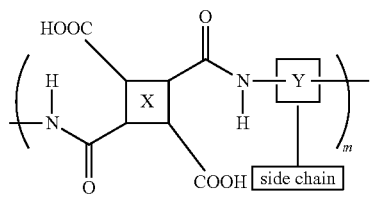

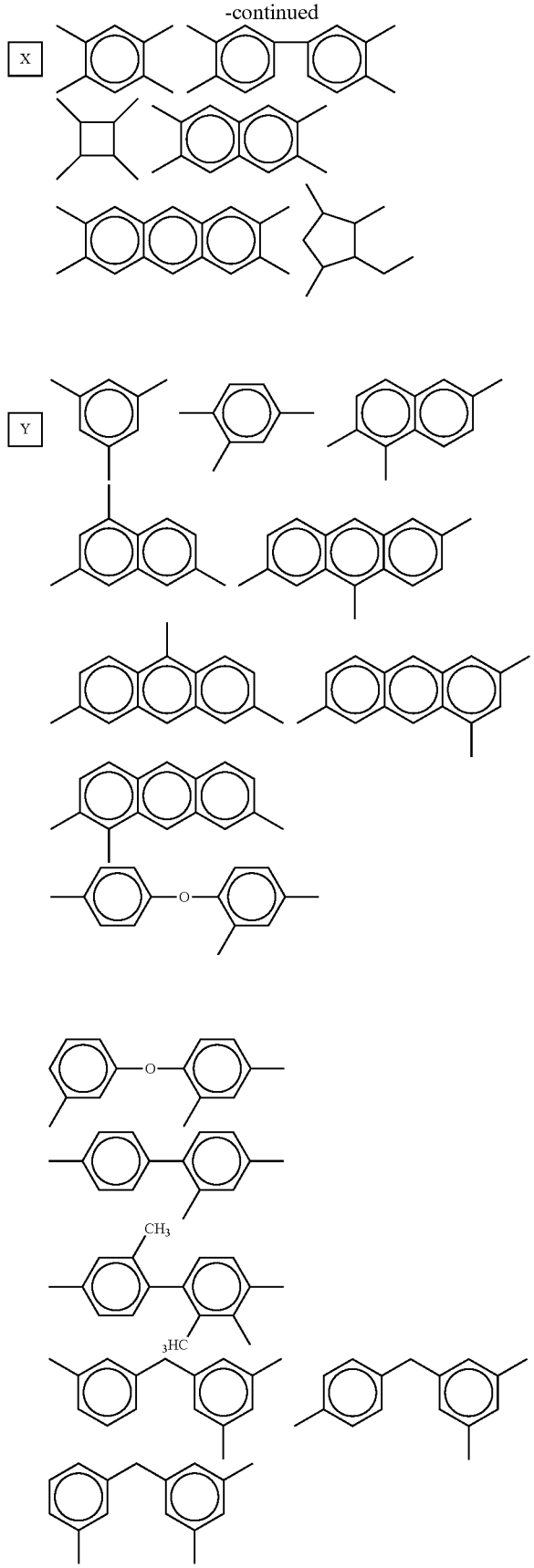

The side chain of the second polyimide p2 and/or the precursor thereof is represented by general formula (4).

[Formula 17]

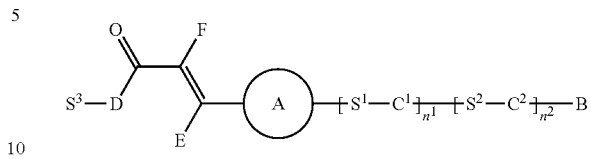

(4)

A represents pyrimidine-2,5-diyl, pyridine-2,5-diyl, 2,5-thiophenylene, 2,5-furanylene, 1,4- or 2,6-naphthylene, or phenylene, optionally substituted by a group selected from fluorine, chlorine, and cyano, or by a $C_{1-18}$ cyclic, linear, or branched alkyl residue (which is optionally substituted by one cyano group or one or more halogen atoms, where one or more non-adjacent —$CH_2$— groups of the alkyl are optionally replaced by a group Q).

B is a linear or branched alkyl residue which is unsubstituted, mono-substituted by cyano or halogen, or poly-substituted by halogen, having 3 to 18 carbon atoms (where one or more non-adjacent $CH_2$ groups may independently be replaced by a group Q).

$C^1$ and $C^2$ each independently of the other represent an aromatic or alicyclic group (which is unsubstituted or substituted by fluorine, chlorine, cyano, or by a cyclic, linear, or branched alkyl residue (which is unsubstituted, mono-substituted by cyano or halogen, or poly-substituted by halogen, having 1 to 18 carbon atoms and where one or more non-adjacent $CH_2$ groups may independently be replaced by a group Q)). D represents an oxygen atom or —$NR^1$— (where $R^1$ represents a hydrogen atom or lower alkyl).

$S^1$ and $S^2$ each independently of the other represent a single covalent bond or a spacer unit. $S^3$ represents a spacer unit.

Q represents a group selected from —O—, —CO—, —CO—O—, —O—CO—, —Si($CH_3$)$_2$—O—Si($CH_3$)$_2$—, —$NR^1$—, —CO—$NR^1$—, $NR^1$—CO—O—, —O—CO—$NR^1$—, $NR^1$—CO—$NR^1$—, —CH=CH—, —C≡C—, and —O—CO—O— (where $R^1$ represents a hydrogen atom or lower alkyl). E and F each independently of the other represent hydrogen, fluorine, chlorine, cyano, alkyl optionally substituted by fluorine having carbon atoms 1 to 12 (where optionally one or more non-adjacent $CH_2$ groups are replaced by —O—, —CO—O—, —O—CO— and/or —CH=CH—).

Herein, it is preferable that A includes an aromatic compound; B includes fluorocarbon; D includes at least one or more hydrocarbon groups; and E and F include hydrogen atoms.

Note that the side chain of the second polyimide p2 may contain a fluorine atom. When the side chain of the second polyimide p2 contains a fluorine atom, the aforementioned image sticking is suppressed to a certain extent Moreover, the second polyimide p2 may have a cinnamate group as a photoreactive functional group. In this case, a dimerization site is formed in the side chain through light irradiation. Specifically, the second polyimide p2 is represented by formula (3a').

[Formula 18]

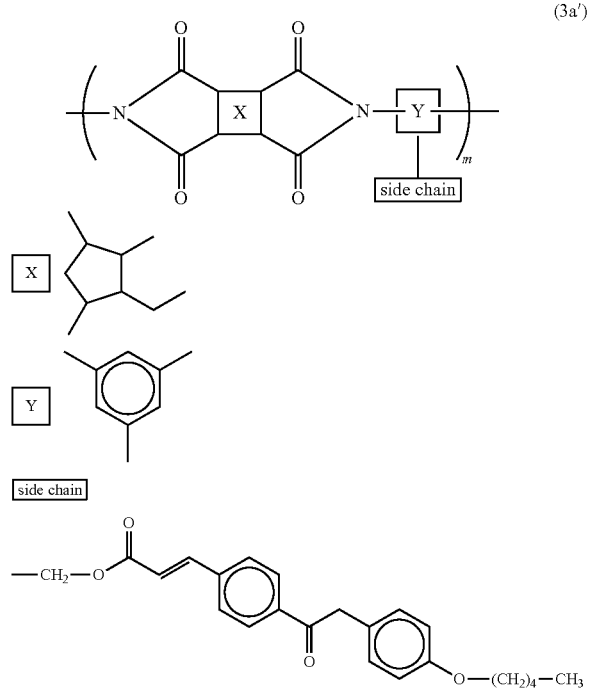

(3a')

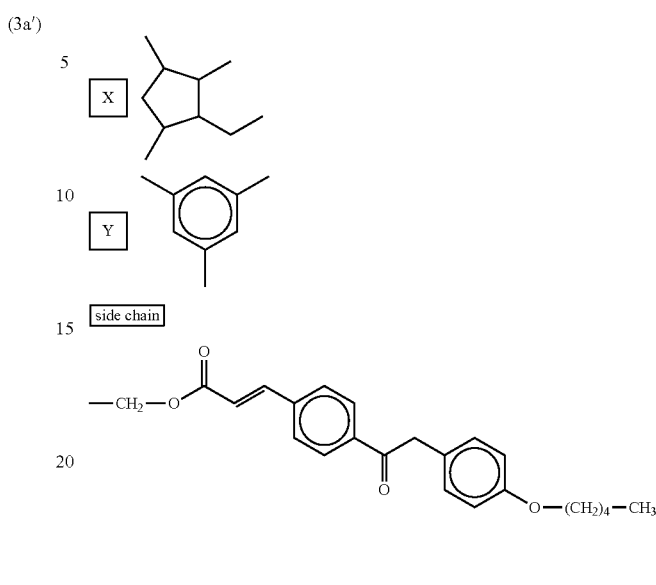

The precursor thereof is represented by formula (3a).

[Formula 19]

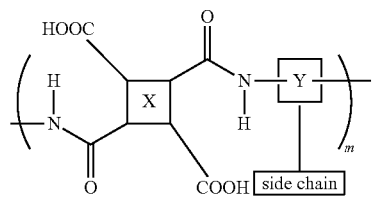

(3a)

Note that the ratio between the precursor of the first polyimide p1 and the second polyimide p2 and the precursor thereof is, in ratio by weight, on the order of 50%:50% to 80%:20%. Note that the vinyl-type monomer does not form a covalent bond with the precursor of the first polyimide p1 or the second polyimide p2 or the precursor thereof.

Thus, the alignment film material contains the precursor (polyamic acid) of the first polyimide p1 and the second polyimide p2 and the precursor thereof (polyamic acid). Herein, the second polyimide p2 and the precursor thereof have a photoreactive functional group as represented by structural formulae (3a') and (3a), whereas the precursor of the first polyimide p1 does not have any photoreactive functional groups, as represented by structural formula (2a).

Alternatively, the second polyimide p2 may have a vertical alignment group in its side chain. For example, the precursor of the second polyimide p2 may be represented by structural formula (3b').

[Formula 18]

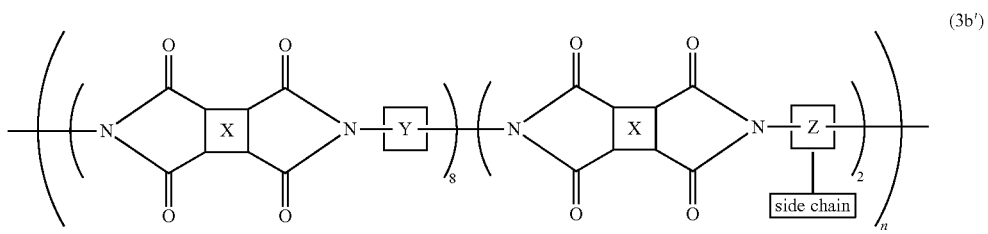

(3b')

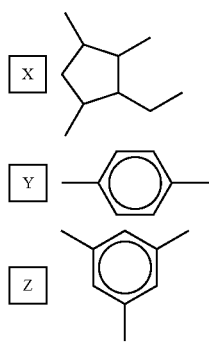
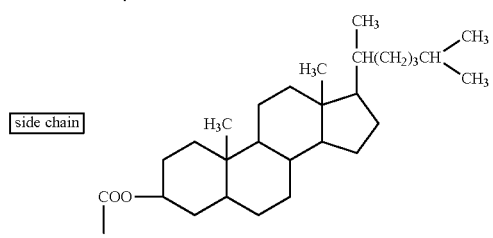
The precursor of the second polyimide p2 may be represented by structural formula (3b).
[Formula 21]
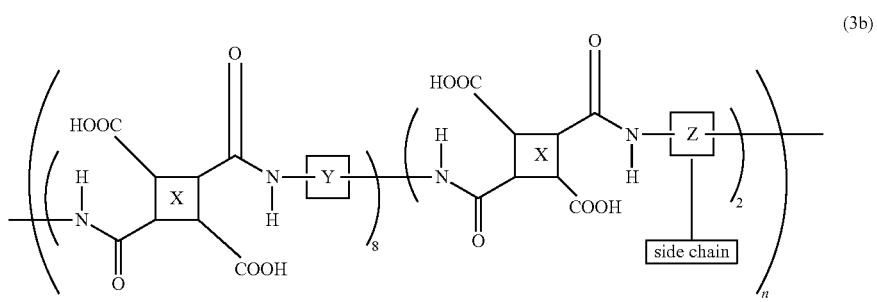
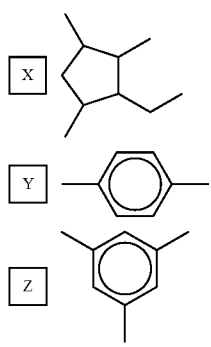
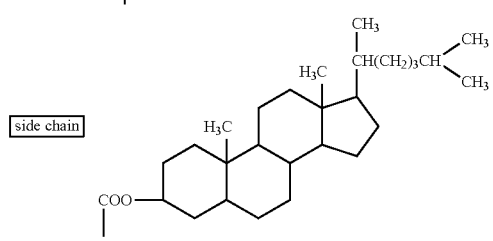

In the alignment film material, the fraction of imide units of the second polyimide p2 is e.g. approximately 50%, but the first polyimide p1 is not imidized but remains as the precursor in the alignment film material, with a fraction of imide units of 0%.

Note that, if an alignment film is formed by applying an alignment film material onto an electrode by a printing technique, ink jet technique, or spin coating technique without mixing a vinyl-type monomer thereto, a first alignment layer whose main component is the first polyimide will be formed above, and a second alignment layer whose main component is the second polyimide will be formed below (i.e., the liquid crystal layer side).

In the present embodiment, as described above, the alignment film material contains a vinyl-type monomer. The vinyl-type monomer may have two or more directly-bonded ring structures or one or more condensed ring structures, for example. For example, a methacrylate-type monomer, an acrylate-type monomer, a methacrylamide-type monomer, or an acrylamide-type monomer is used as the vinyl-type monomer.

The vinyl-type monomer is represented by general formula (1) P1-A1-(Z1-A2)n-P2 (in general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and Z1 is a —OCO— group, a —OCO— group, a —O— group, a —CONH— group or a single bond, where n is 0 or 1). For example, the vinyl-type monomer is represented by structural formula (1a).

[Formula 22]

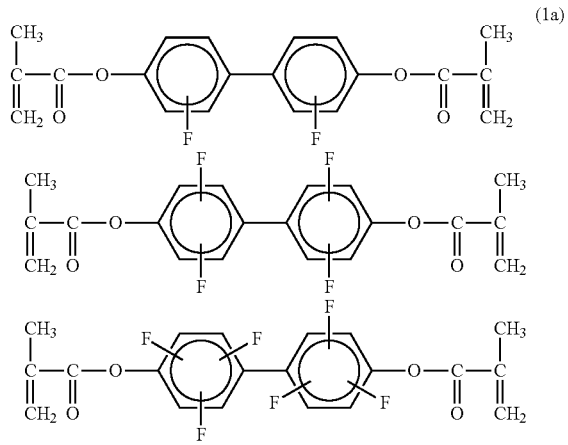

Herein, the monomer has a symmetrically-bound fluorine group(s) in the two benzene rings.

Moreover, the solvent contains γ-butyrolactone and N-methylpyrrolidone (NMP), for example. The concentration of the vinyl-type monomer on the basis of the alignment film material is no less than 2 wt % and no more than 20 wt %, for example.

Next, the alignment film material is applied on the pixel electrodes 224, and a heat treatment is conducted to form the first alignment film 110. As the heat treatment, for example, two heat treatments may be performed at different temperatures. Specifically, after performing a first heat treatment, a second heat treatment is performed at a higher temperature than that of the first heat treatment. The first heat treatment removes most of the solvent. In the following description, what remains after the solvent has been substantially removed will be referred to as an alignment film. Moreover, through the subsequent second heat treatment, imidization and polymerization progress, whereby the alignment film is stabilized. The first heat treatment is also referred to as a pre-bake, and the second heat treatment a full bake. Through the heat treatment, the polyamic acid is imidized, whereby the first and second polyimides p1 and p2 are formed.

Also through the heat treatment, the vinyl-type monomer is polymerized to form the polyvinyl compound pv. Thus, the first alignment film 110 is formed. The polyvinyl compound pv, which contains a fluorine group, is present on the surface of the first alignment film 110 as well as the neighborhood thereof. The polyvinyl compound pv does not form a covalent bond with the first polyimide p1 or the second polyimide p2.

The heat treatment increases the fraction of imide units of the first and second polyimides p1 and p2. For example, the fraction of imide units of the second polyimide p2 is approximately 70% to 80%, and the fraction of imide units of the first polyimide p1 is approximately 40% to 50%. Thus, even after the heat treatment, the fraction of imide units of the second polyimide p2 is higher than the fraction of imide units of the first polyimide p1.

Next, the first alignment film 110 is subjected to an alignment treatment. The alignment treatment may be performed after the first heat treatment, or after the second heat treatment. For example, the alignment treatment is performed by irradiating the first alignment film 110 with light. For example, light of wavelengths in the range of no less than 250 nm and no more than 400 nm is radiated onto the first alignment film 110 at an irradiation dose of no less than 20 mJ/cm$^2$ and no more than 200 mJ/cm$^2$, from a direction which is inclined from the normal direction of the principal face of the first alignment film 110. If the irradiation dose increases from 200 mJ/cm$^2$, the alignment film may deteriorate so that the voltage holding ratio and the like may be lowered. Moreover, the irradiation angle of light may be in the range of no less than 5° and no more than 85°, and preferably no less than 40° and no more than 60°, from the normal direction of the principal face of the first alignment film 110. Note that, when the irradiation angle is small, it becomes difficult to confer a pretilt angle; when the irradiation angle is too large, it takes more time to confer the same pretilt. Moreover, light may be unpolarized light, linearly polarized light, elliptically polarized light, or circularly polarized light. However, linearly polarized light is to be used in the case where a cinnamate group is used as the photoreactive functional group. Alternatively, a rubbing treatment or an ion beam irradiation may be performed for the first alignment film 110 as the alignment treatment.

As shown in FIG. 4(b), the counter electrode 244 is formed on the second insulative substrate 242. Moreover, an alignment film material is provided. This alignment film material may be similar to that of the first alignment film 110.

Next, the alignment film material is applied on the counter electrode 244, and a heat treatment is conducted to form the second alignment film 120. As the heat treatment, for example, two heat treatments may be performed at different temperatures. Through the heat treatment, the first and second polyimides p1 and p2 due to solvent evaporation and imidization, and the vinyl-type monomer is polymerized to form the polyvinyl compound pv. Next, the second alignment film 120 formed in this manner is subjected to an alignment treatment. The alignment treatment is performed in a similar manner to the first alignment film 110.

Next, as shown in FIG. 4(c), the active matrix substrate 220 and the counter substrate 240 are attached together so that the first alignment film 110 and the second alignment film 120 oppose each other. In the present specification, before formation of the liquid crystal layer, the active matrix substrate and the counter substrate attached together will be referred to as a "vacant panel".

Next, a liquid crystal material is provided, and the liquid crystal material is introduced between the first alignment film 110 and the second alignment film 120 of the vacant panel, thus forming the liquid crystal layer 260. As described above, the first and second alignment films 110 and 120 have been subjected to an alignment treatment, and thus the liquid crystal molecules 262 are aligned so as to be inclined from the normal directions of the principal faces of the first and second alignment films 110 and 120 even in the absence of an applied voltage. Moreover, the polyvinyl compound pv maintains the alignment of the liquid crystal molecules 262, whereby image sticking is suppressed. The liquid crystal panel 300 is produced in this manner. Thereafter, the driving circuit 350 and the control circuit 360 shown in FIG. 2(a) are mounted on the liquid crystal panel 300, whereby the liquid crystal display device 200 is produced.

In the aforementioned PSA technique, polymerization product is formed under an applied voltage. In the case where ultraviolet for polymer formation purposes is radiated while thus applying a voltage, a complex fabrication apparatus is required in which a device for applying a voltage across the liquid crystal panel and a device for radiating ultraviolet light are integrated. Moreover, since ultraviolet light irradiation is performed after a voltage is applied across the liquid crystal panel for a long time for obtaining a predetermined alignment, this fabrication apparatus needs to be used for a long time. Moreover, when forming the liquid crystal layer of a liquid crystal panel through dropwise application of a liquid crystal material, generally speaking, a plurality of liquid crystal panels are simultaneously produced by using a large-sized mother glass substrate, and thereafter each liquid crystal panel is cut out from the large-sized mother glass substrate. In this case of simultaneously producing a plurality of liquid crystal panels, a design must be adopted such that special wiring lines are formed on the mother glass substrate for allowing a voltage to be simultaneously applied to the plurality of liquid crystal panels.

Moreover, in the case where a liquid crystal panel of a particularly large size is to be produced, it is difficult to uniformly apply a voltage across the liquid crystal layer in the respective pixels. If ultraviolet light irradiation is performed with non-uniform voltages being applied, there will be fluctuations in the pretilt angle.

Moreover, in the case of applying a voltage during polymer formation, ribs, slits, or rivets need to be provided on the pixel electrode and the counter electrode for improved viewing angle characteristics. This will result in an increased number of steps and a decrease in the effective aperture ratio.

On the other hand, according to the present embodiment, no voltage is applied when forming the polyvinyl compound pv. Therefore, the liquid crystal display device 200 can be easily produced without using a complex fabrication apparatus. Moreover, a liquid crystal panel can be easily produced even when producing the liquid crystal layer 260 through dropwise application of a liquid crystal material. Moreover, since it is not necessary to apply a voltage across the liquid crystal layer 260 of all pixels when forming the polyvinyl compound pv, changes in the pretilt angle among liquid crystal molecules 262 can be suppressed. Furthermore, the viewing angle can be improved without providing ribs, slits, or rivets on the pixel electrodes 224 and the counter electrode 244, thus reducing an increase in the number of steps.

Note that slits, ribs, and/or rivets may be provided on the pixel electrodes 224 and the counter electrode 244. Alternatively, slits, ribs, and/or rivets may not be provided on the pixel electrodes 224 and the counter electrode 244, and the liquid crystal molecules 262 may be aligned in accordance with an oblique electric field which is created by a highly-symmetrical pixel electrode 226 and the counter electrode 246. As a result, the alignment regulating force of the liquid crystal molecules 262 under an applied voltage can be further increased.

Although the above description illustrates that the first and second alignment films 110 and 120 are made of the same alignment film material, the present invention is not limited thereto. The first and second alignment films 110 and 120 may be made of different alignment film materials. For example, at least one of the first and second polyimides p1 and p2 and the polyvinyl compound pv of the first alignment film 110 may differ from at least one of the first and second polyimides p1 and p2 and the polyvinyl compound pv of the second alignment film 120.

Although the above description illustrates that the first and second alignment films 110 and 120 each contain the polyvinyl compound pv, the present invention is not limited thereto. Only one of the first and second alignment films 110 and 120 may contain the corresponding polyvinyl compound pv.

Although the above description illustrates that the active matrix substrate 220 and the counter substrate 240 respectively include the first and second alignment films 110 and 120, the present invention is not limited thereto. Only one of the active matrix substrate 220 and the counter substrate 240 may include the corresponding first or second alignment film 110 or 120.

Although the above description illustrates that polyvinyl compound pv is formed through a heat treatment, the present invention is not limited thereto. The polyvinyl compound pv may be formed through light irradiation. For example, in such light irradiation, a light source which mainly emits ultraviolet light (i-line) with a wavelength of 365 nm is suitably used. The irradiation time is about 500 seconds, for example, and the irradiation intensity of light is about 20 mW/cm$^2$. In the case where polymerization is effected through light irradiation, the polyfunctional monomer will sufficiently polymerize even if the irradiation intensity of light is 10 mW/cm$^2$ or less. The wavelength of light is preferably in the range of no less than 250 nm and no more than 400 nm, and more preferably in the range of no less than 300 nm and no more than 400 nm. However, polymerization will sufficiently occur with light of a wavelength greater than 400 nm. Although polymerization can occur with light of a wavelength of 300 nm or less, the irradiation dose should preferably be as small as possible because decomposition of organic matter will occur with irradiation of deep-ultraviolet with wavelengths near 200 nm.

Figure 5:
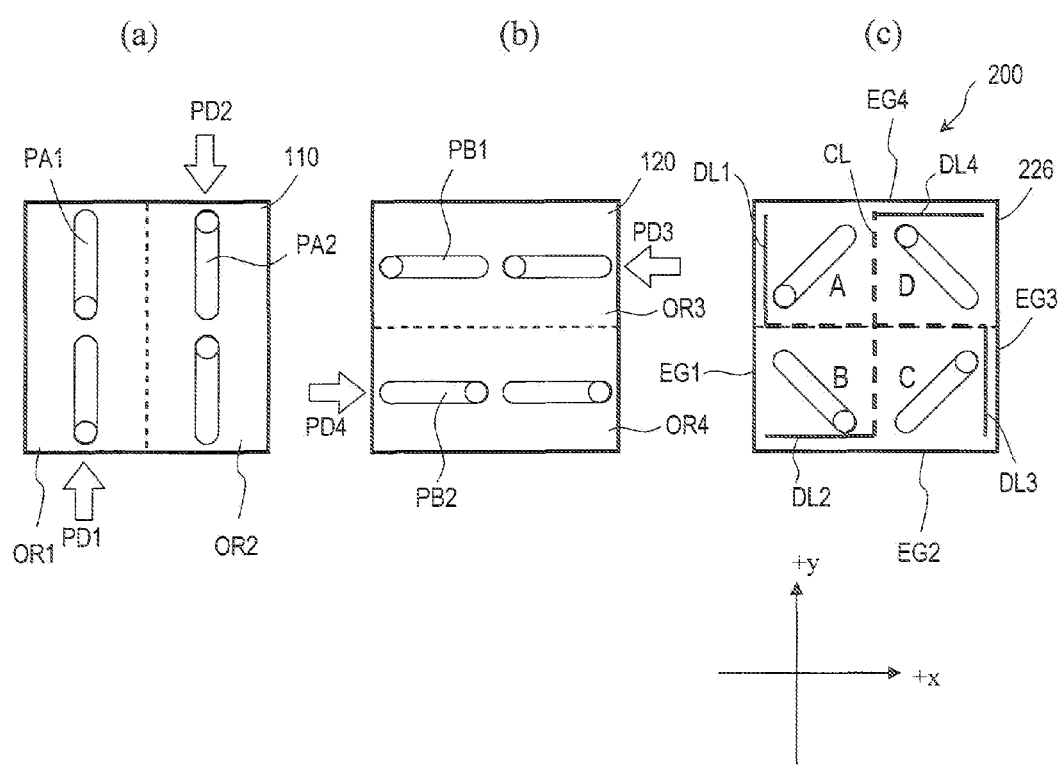
FIG. 5(a) is a schematic diagram of an alignment film of the liquid crystal display device of the present embodiment; (b) is a schematic diagram of the alignment film; and (c) is a schematic diagram showing alignment directions of liquid crystal molecules in the centers of liquid crystal domains.

Moreover, the liquid crystal display device 200 may be of the 4D-RTN (4 Domain-Reverse Twisted Nematic) mode. Hereinafter, a liquid crystal display device of the 4D-RTN mode will be described with reference to FIG. 5.

FIG. 5(a) shows pretilt directions PA1 and PA2 of liquid crystal molecules defined on the alignment film 110 of the active matrix substrate 220, and FIG. 5(b) shows pretilt directions PB1 and PB2 of liquid crystal molecules defined on the alignment film 120 of the counter substrate 240. FIG. 5(c) shows alignment directions of liquid crystal molecules in the centers of liquid crystal domains A to D under an applied voltage, and regions (domain lines) DL1 to DL4 appearing dark due to alignment disorder. Note that the domain lines DL1 to DL4 are not so-called disclination lines.

FIG. 5(a) to FIG. 5(c) schematically show alignment directions of liquid crystal molecules as seen from the viewer side. FIG. 5(a) to FIG. 5(c) indicate that the end portions (essentially circular portions) of the cylindrical liquid crystal molecules are tilted toward the viewer.

As shown in FIG. 5(a), the first alignment film 110 includes a first alignment region OR1 and a second alignment region OR2. The liquid crystal molecules regulated by the first alignment region OR1 are tilted in the −y direction from the normal direction of the principal face of the first alignment film 110, whereas the liquid crystal molecules regulated by the second alignment region OR2 of the first alignment film 110 are tilted in the +y direction from the normal direction of the principal face of the first alignment film 110. Moreover, the boundary between the first alignment region OR1 and the second alignment region OR2 extends in the column direction (y direction), and located in the substantial center along the row direction (x direction) of pixels. Thus, first and second alignment regions OR1 and OR2 of different pretilt azimuths are provided on the first alignment film 110.

Moreover, as shown in FIG. 5(b), the second alignment film 120 includes a third alignment region OR3 and a fourth alignment region OR4. The liquid crystal molecules regulated by the third alignment region OR3 are tilted in the +x direction from the normal direction of the principal face of the second alignment film 120, such that the −x direction end portions of these liquid crystal molecules are pointed toward the front face. The liquid crystal molecules regulated by the fourth alignment region OR4 of the second alignment film 120 are tilted in the −x direction from the normal direction of the principal face of the second alignment film 120, such that the +x direction end portions of these liquid crystal molecules are pointed toward the front face. Thus, the second alignment film 120 includes third and fourth alignment regions OR3 and OR4 with different pretilt azimuths.

An alignment treatment direction corresponds to an azimuth angle component obtained by projecting a direction, which extends toward an alignment region along the major axes of the liquid crystal molecules, onto that alignment region. The alignment treatment directions of the first, second, third, and fourth alignment regions are also referred to as first, second, third, and fourth alignment treatment directions.

The first alignment region OR1 of the first alignment film 110 has been subjected to an alignment treatment along a first alignment treatment direction PD1, whereas the second alignment region OR2 has been subjected to an alignment treatment along a second alignment treatment direction PD2 which is different from the first alignment treatment direction PD1. The first alignment treatment direction PD1 is essentially antiparallel to the second alignment treatment direction PD2. Moreover, the third alignment region OR3 of the second alignment film 120 has been subjected to an alignment treatment along a third alignment treatment direction PD3, whereas the fourth alignment region OR4 has been subjected to an alignment treatment along a fourth alignment treatment direction PD4 which is different from the third alignment treatment direction PD3. The third alignment treatment direction PD3 is essentially antiparallel to the fourth alignment treatment direction PD4.

As shown in FIG. 5(c), four liquid crystal domains A, B, C, and D are formed in the liquid crystal layer of a pixel. In the liquid crystal layer 260, a portion interposed between the first alignment region OR1 of the first alignment film 110 and the third alignment region OR3 of the second alignment film 120 defines the liquid crystal domain A; a portion interposed between the first alignment region OR1 of the first alignment film 110 and the fourth alignment region OR4 of the second alignment film 120 defines a liquid crystal domain B; a portion interposed between the second alignment region OR2 of the first alignment film 110 and the fourth alignment region OR4 of the second alignment film 120 defines a liquid crystal domain C; and a portion interposed between the second alignment region OR2 of the first alignment film 110 and the third alignment region OR3 of the second alignment film 120 defines a liquid crystal domain D. Note that the angle constituted by the first or second alignment treatment direction PD1 or PD2 and the third or fourth alignment treatment direction PD3 or PD4 is essentially 90°, and the twist angle in each of the liquid crystal domains A, B, C, and D is essentially 90°.

The alignment direction of a liquid crystal molecule at the center of a liquid crystal domain A to D is an intermediate direction between the pretilt direction for liquid crystal molecules introduced by the first alignment film 110 and the pretilt direction for liquid crystal molecules introduced by the second alignment film 120. In the present specification, the alignment direction of a liquid crystal molecule in the center of a liquid crystal domain is referred to as a reference alignment direction; and within the reference alignment direction, an azimuth angle component in a direction from the rear face toward the front face and along the major axis of the liquid crystal molecule (i.e., an azimuth angle component obtained by projecting the reference alignment direction onto the principal face of the first alignment film 110 or the second alignment film 120) is referred to as a reference alignment azimuth. The reference alignment azimuth characterizes its corresponding liquid crystal domain, and exerts a predominant influence on the viewing angle characteristics of that liquid crystal domain. Now, by relying on the horizontal direction (right-left direction) of the display screen (plane of the figure) as a reference for the azimuthal direction, and defining the left turn as positive (i.e., if the display surface is compared to the face of a clock, counterclockwise is positive, the 3 o'clock direction being an azimuth angle of 0°), the reference alignment directions of the four liquid crystal domains A to D are set to be four directions such that the difference between any two directions is substantially equal to an integer multiple of 90°. Specifically, the reference alignment azimuths of the liquid crystal domains A, B, C, and D are, respectively, 225°, 315°, 45°, and 135°.

As shown in FIG. 5(c), the domain lines DL1 to DL4 are respectively formed in the liquid crystal domains A, B, C, and D. The domain line DL1 is formed in parallel to a portion of an edge EG1 of the pixel electrode 224, whereas the domain line DL2 is formed in parallel to a portion of an edge EG2. Moreover, the domain line DL3 is formed in parallel to a portion of an edge EG3 of the pixel electrode 224, whereas the domain line DL4 is formed in parallel to a portion of an edge EG4. Moreover, a disclination line CL indicated by a broken line is observed in a border region where each of the liquid crystal domains A to D adjoins another liquid crystal domain. The disclination lines CL are dark lines in the aforementioned central portion. The disclination lines CL and the domain lines DL1 to DL4 are continuous, thus resulting in dark lines of a reverse shape. Although the dark lines herein are in a reverse shape, the dark lines may be in an 8 shape.

Although the above-described liquid crystal display device is of the 4D-RTN mode, the present invention is not limited thereto. The liquid crystal display device may be of the CPA mode.

Although the above description illustrates that each alignment film includes two alignment layers, the present invention is not limited thereto. Each alignment film may include three or more alignment layers.

Hereinafter, alignment films and liquid crystal display devices of the present Example will be described.

Example 1

Example 1-1

Figure 6:
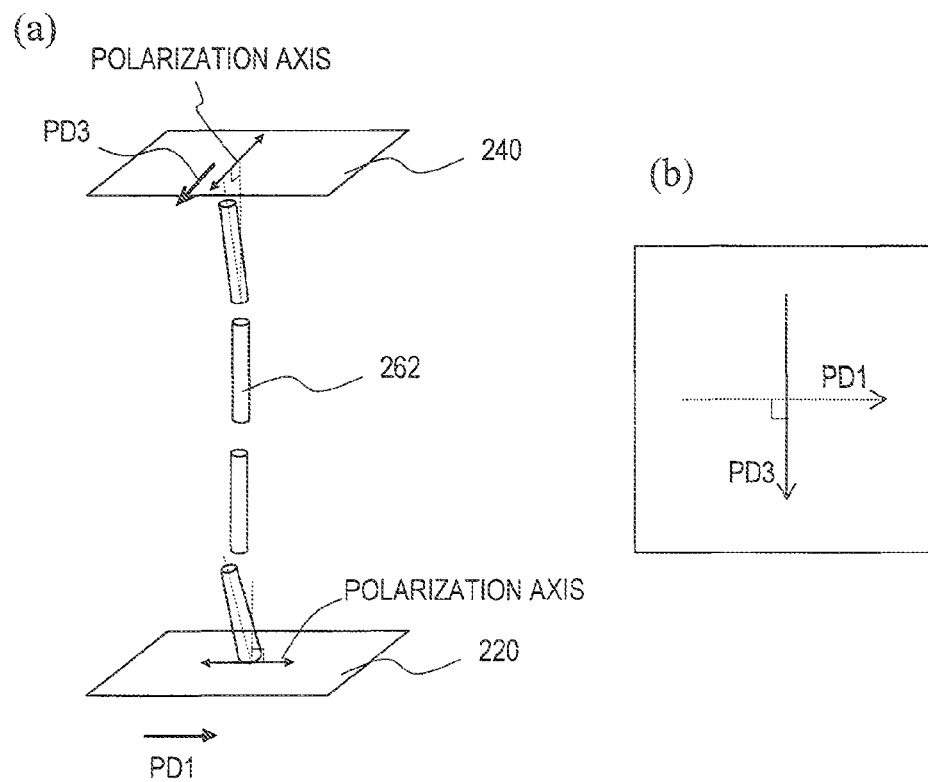
FIG. 6(a) is a schematic diagram showing an alignment state of liquid crystal molecules in a liquid crystal display device of Example 1-1; and (b) is a schematic diagram showing alignment treatment directions for the first and second alignment films as viewed from the viewer's side.

Hereinafter, with reference to FIG. 2 and FIG. 6, an alignment film and a liquid crystal display device of Example 1-1 will be described. The liquid crystal display device of Example 1-1 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, a vertical-alignment type alignment film material was provided. This alignment film material was an alignment film material intended for use in a photo-alignment film. The alignment film material was formed by, after allowing a precursor of the first polyimide p1 and the second polyimide p2 and a precursor thereof to be dissolved in a solvent, further adding a vinyl-type monomer thereto. The precursor of the first polyimide p1 was a polyamic acid as represented by structural formula (2a), and the second polyimide p2 was a photo-alignable polyimide as represented by structural formula (3a'). The fraction of imide units of the second polyimide was approximately 50%. As the vinyl-type monomer, a biphenyldimethacrylate monomer as represented by structural formula (1a) was added, to a concentration of 10 wt % on the basis of the alignment film material. Herein, three kinds of alignment film materials were provided which had 2, 4, or 6 fluorine groups per monomer. For comparison, an alignment film material which had zero fluorine groups per monomer was also provided.

Next, the alignment film material was applied on the pixel electrodes 224 by a printing technique, ink jet technique, or spin coating technique, and the solvent was removed to a certain extent through one minute of heating at 90° C. as a first heat treatment (pre-bake), further followed by 40 minutes of heating at 200° C. as a second heat treatment (full bake). Through such heat treatments, the polyamic acid was imidized, whereby the first alignment layer 112 containing the first polyimide p1 and the second alignment layer 114 containing the second polyimide p2 were formed. In this manner, the first alignment film 110 was formed on the pixel electrodes 224.

Thereafter, obliquely from a 40° direction with respect to the normal direction of a principal face of the first alignment film 110, P-polarized light with a peak wavelength 330 nm was radiated at 50 mJ/cm$^2$, thus performing a photo-alignment treatment. Similarly, the aforementioned alignment film material was applied to form the second alignment film 120 on the counter electrode 244, and a photo-alignment treatment was performed. Upon analyzing the first and second alignment films 110 and 120, the dimethacrylate represented by structural formula (1a) had been polymerized, and the polyvinyl compound pv existed also on the alignment film surface.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy $\Delta\varepsilon$ of −3, and a birefringence $\Delta n$ of 0.085.

FIG. 6(a) shows an alignment state of the liquid crystal molecules 262 in the liquid crystal display device of Example 1-1. As shown in FIG. 6(b), the active matrix substrate 220 and the counter substrate 240 were attached together so that the angle between the alignment treatment direction PD1 of the first alignment film 110 and the alignment treatment direction PD3 of the second alignment film 120 was 90°, and the liquid crystal molecules 262 had a twist angle of 90°. Herein, the polarization axis of the polarizer on the active matrix substrate 220 was parallel to the alignment treatment direction of the first alignment film 110, and the polarization axis of the polarizer on the counter substrate 240 was parallel to the alignment treatment direction of the second alignment film 120. In this manner, a liquid crystal panel was produced. Table 1 shows a relationship between the number of fluorine groups per monomer and the pretilt angle.

TABLE 1

| | number of fluorine groups | | | |
|---|---|---|---|---|
| | 0 | 2 | 4 | 6 |
| pretilt angle (°) | 87.7 | 87.2 | 87.0 | 86.9 |

As will be understood from Table 1, the pretilt angle decreases as the number of fluorine groups increases.

Next, the resultant liquid crystal panel was subjected to a power-on test of continuously applying a voltage of ±10 V for 50 hours at room temperature, and thereafter an amount of change in the tilt angle was measured. Table 2 shows results thereof.

TABLE 2

| | number of fluorine groups | | | |
|---|---|---|---|---|
| | 0 | 2 | 4 | 6 |
| pretilt angle (°) | 87.7 | 87.2 | 87.0 | 86.9 |
| amount of change in the tilt angle (°) | 0.12 | 0.05 | 0.04 | 0.04 |

As will be understood from Table 2, the amount of change in the tilt angle is reduced when the monomer has any fluorine groups. This is presumably because the density of the vinyl-type monomer or the polyvinyl compound pv present on the surface of the first and second alignment films 110 and 120 was increased due to the fluorine group(s), so that the change in the tilt angle of the liquid crystal molecules 262 was reduced due to interaction between the polyvinyl compound pv and the liquid crystal molecules 262. There is a tendency that image sticking becomes outstanding when the amount of change in the tilt angle exceeds 0.10°. A voltage holding ratio measured after finishing the power-on test was 99.5% or more, indicative that powering had been sufficiently conducted.

With the liquid crystal display device of Example 1-1, a high aperture ratio was realized without providing ribs or slits as in the case of the MVA mode. Moreover, since voltage application was not performed at the time of polymerization, it was possible to produce the liquid crystal display device was Example 1-1 without employing a complex fabrication apparatus.

Example 1-2

Hereinafter, with reference to FIG. 2 and FIG. 6, an alignment film and a liquid crystal display device of Example 1-2 will be described. The liquid crystal display device of Example 1-2 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, a vertical-alignment type alignment film material was provided. This alignment film material was an alignment film material intended for use in a photo-alignment film. The alignment film material was formed by, after allowing a precursor of the first polyimide p1 and the second polyimide p2 and a precursor thereof to be dissolved in a solvent, adding a vinyl-type monomer thereto. The precursor of the first polyimide p1 was a polyamic acid as represented by structural formula (2a), and the second polyimide p2 was a photo-alignable polyimide as represented by structural formula (3a'). The fraction of imide units of the second polyimide p2 was approximately 50%. As the vinyl-type monomer, a dimethacrylate monomer as represented by formula (1a) was added, to a concentration of 10 wt % on the basis of the alignment film material. Herein, three kinds of alignment film materials were provided which had 2, 4, or 6 fluorine groups per monomer. For comparison, an alignment film material which had zero fluorine groups per monomer was also provided.

Next, the alignment film material was applied on the pixel electrodes 224 by a printing technique, ink jet technique, or spin coating technique, and the solvent was removed to a certain extent through one minute of heating at 90° C. as a first heat treatment (pre-bake). Thereafter, obliquely from a 40° direction with respect to the normal direction of a principal face of the first alignment film 110, P-polarized light with a peak wavelength of 330 nm was radiated at 50 mJ/cm², thus performing a photo-alignment treatment. Thereafter, 40 minutes of heating at 150° C. was performed as a second heat treatment (full bake). Through such heat treatments, the polyamic acid was imidized, and the first alignment layer 112 containing the first polyimide p1 and the second alignment layer 114 containing the second polyimide p2 were formed. In this manner, the first alignment film 110 was formed on the pixel electrodes 224.

Similarly, the aforementioned alignment film material was applied to form the second alignment film 120 on the counter electrode 244, and a photo-alignment treatment was performed. Upon analyzing the first and second alignment films 110 and 120, the dimethacrylate represented by formula (1a) had been polymerized, and the polyvinyl compound pv existed also on the alignment film surface.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy $\Delta\epsilon$ of −3, and a birefringence $\Delta n$ of 0.085. In this manner, a liquid crystal panel was produced. Table 3 shows a relationship between the number of fluorine groups per monomer and the pretilt angle.

TABLE 3

| | number of fluorine groups | | | |
|---|---|---|---|---|
| | 0 | 2 | 4 | 6 |
| pretilt angle (°) | 87.5 | 87.0 | 87.0 | 86.9 |

As will be understood from Table 3, the pretilt angle is large when the number of fluorine groups per monomer is zero, whereas the pretilt angle becomes lower when the monomer has any fluorine groups. Incidentally, when the full bake after the photo-alignment treatment was performed at 200° C., the pretilt angle was 89.9° or more under all conditions.

Next, the resultant liquid crystal panel was subjected to a power-on test of continuously applying a voltage of ±10 V for 50 hours at room temperature, and thereafter an amount of change in the tilt angle was measured. Table 4 shows results thereof.

TABLE 4

| | number of fluorine groups | | | |
|---|---|---|---|---|
| | 0 | 2 | 4 | 6 |
| pretilt angle (°) | 87.5 | 87.0 | 87.0 | 86.9 |
| amount of change in the tilt angle (°) | 0.10 | 0.04 | 0.04 | 0.04 |

The above results indicates that, as in Example 1-1, when the monomer had any fluorine groups, the density of the monomer and polyvinyl compound present on the surface of the first and second alignment films 110 and 120 was increased, whereby the change in the tilt angle was suppressed. A voltage holding ratio measured after finishing the power-on test was 99.5% or more, indicative that powering had been sufficiently conducted.

Example 1-3

Hereinafter, with reference to FIG. 2 and FIG. 6, an alignment film and a liquid crystal display device of Example 1-3 will be described. The liquid crystal display device of Example 1-3 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, a vertical-alignment type alignment film material was provided. This alignment film material was an alignment film material intended for use in a photo-alignment film. The alignment film material was formed by, after allowing a precursor of the first polyimide p1 and the second polyimide p2 and a precursor thereof to be dissolved in a solvent, adding a vinyl-type monomer thereto. The precursor of the first polyimide p1 was a polyamic acid as represented by structural formula (2a), and the second polyimide p2 was a photo-alignable polyimide as represented by structural formula (3a'). The fraction of imide units of the second polyimide p2 was approximately 50%. As the vinyl-type monomer, a dimethacrylate monomer as represented by formula (1a) was added. Herein, a dimethacrylate monomer having four fluorine groups per monomer was used. The concentration thereof was 5, 10, 15, 20, or 30 wt % on the basis of the alignment film material. For comparison, an alignment film material in which the concentration of the dimethacrylate monomer was zero (i.e., to which no dimethacrylate monomer had been added) was also provided.

Next, the alignment film material was applied on the pixel electrodes 224 by a printing technique, ink jet technique, or spin coating technique, and the solvent was removed to a certain extent through one minute of heating at 90° C. as a first heat treatment (pre-bake), further followed by 40 minutes of heating at 200° C. as a second heat treatment (full bake). Through such heat treatments, the polyamic acid was imidized, whereby the first alignment layer 112 containing the first polyimide p1 and the second alignment layer 114 containing the second polyimide p2 were formed. In this manner, the first alignment film 110 was formed on the pixel electrodes 224.

Thereafter, obliquely from a 40° direction with respect to the normal direction of a principal face of the first alignment film 110, P-polarized light with a peak wavelength of 330 nm was radiated at 50 mJ/cm$^2$, thus performing a photo-alignment treatment. Similarly, the aforementioned alignment film material was applied to form the second alignment film 120 on the counter electrode 244, and a photo-alignment treatment was performed. Upon analyzing the first and second alignment films 110 and 120, the dimethacrylate represented by formula (1a) had been polymerized, and the polyvinyl compound pv existed also on the alignment film surface.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy $\Delta\in$ of −3, and a birefringence Δn of 0.085. In this manner, a liquid crystal panel was produced. Table 5 shows a relationship between the vinyl-type monomer concentration and the pretilt angle.

TABLE 5

| | vinyl-type monomer concentration (wt %) | | | | | |
|---|---|---|---|---|---|---|
| | 0 | 5 | 10 | 15 | 20 | 30 |
| pretilt angle (°) | 88.5 | 87.1 | 87.0 | 87.1 | 87.0 | 87.0 |

As will be understood from Table 5, the pretilt angle is large when the vinyl-type monomer concentration is zero, whereas the pretilt angle becomes lower when any vinyl-type monomer is introduced.

Next, the resultant liquid crystal panel was subjected to a power-on test of continuously applying a voltage of ±10 V for 50 hours at room temperature, and thereafter an amount of change in the tilt angle was measured. Table 6 shows results thereof.

TABLE 6

| | monomer concentration (wt %) | | | | | |
|---|---|---|---|---|---|---|
| | 0 | 5 | 10 | 15 | 20 | 30 |
| pretilt angle (°) | 88.5 | 87.1 | 87.0 | 87.1 | 87.0 | 87.0 |
| amount of change in the tilt angle (°) | 0.17 | 0.06 | 0.04 | 0.04 | 0.04 | 0.04 |

As will be understood from Table 6, the change in the tilt angle can be kept sufficiently small when the concentration of the monomer on the basis of the alignment film material is 5 wt % or more. However, when the monomer concentration was 30 wt % or more, the alignment film appeared slightly whitish due to the polyvinyl compound. This is presumably because of an excessively high concentration of the polymerizable component.

Even when the monomer concentration on the basis of the alignment film material was 30 wt %, an effect of stabilizing the pretilt angle was obtained, but the substrate was significantly whitish; at any higher concentration, decreases in contrast due to scatter were observed. A voltage holding ratio measured after finishing the power-on test was 99.5% or more, indicative that powering had been sufficiently conducted.

Example 1-4

Hereinafter, with reference to FIG. 2 and FIG. 6, an alignment film and a liquid crystal display device of Example 1-4 will be described. The liquid crystal display device of Example 1-4 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, a vertical-alignment type alignment film material was provided. This alignment film material was an alignment film material intended for use in a photo-alignment film. The alignment film material was formed by, after allowing a precursor of the first polyimide p1 and a precursor of the second polyimide p2 to be dissolved in a solvent, adding a vinyl-type monomer thereto. The precursor of the first polyimide p1 was a polyamic acid as represented by structural formula (2a), and the precursor of the second polyimide p2 was a polyamic acid as represented by structural formula (3c).

[Formula 23]

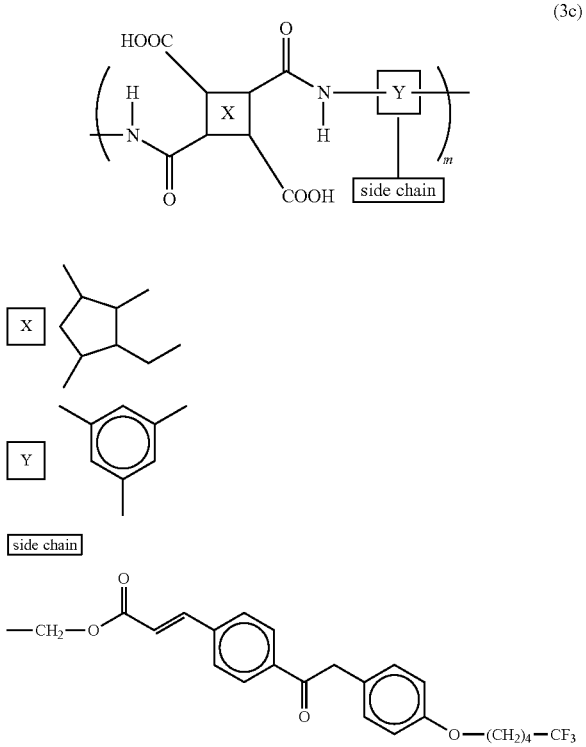

(3c)

Herein, the fraction of imide units of the second polyimide was 0%, as was the fraction of imide units of the first polyimide. As the vinyl-type monomer, a dimethacrylate monomer as represented by formula (1a) was added, to a concentration of 10 wt % on the basis of the alignment film material. Herein, an alignment film material having four fluorine groups per monomer was provided. For comparison, an alignment film material having zero fluorine groups per monomer was also provided.

Next, the alignment film material was applied on the pixel electrodes 224 by a printing technique, ink jet technique, or spin coating technique, and the solvent was removed to a certain extent through one minute of heating at 90° C. as a first heat treatment (pre-bake), further followed by 40 minutes of heating at 200° C. as a second heat treatment (full bake). Through such heat treatment, the polyamic acid was imidized to form the first and second polyimides p1 and p2, and the vinyl-type monomer was polymerized to form the polyvinyl compound pv. In this manner, the first alignment film 110 was formed on the pixel electrodes 224.

Thereafter, obliquely from a 40° direction with respect to the normal direction of a principal face of the first alignment film 110, P-polarized light with a peak wavelength of 330 nm was radiated at 50 mJ/cm², thus performing a photo-alignment treatment. Similarly, the aforementioned alignment film material was applied to form the second alignment film 120 on the counter electrode 244, and a photo-alignment treatment was performed.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy $\Delta\in$ of −3, and a birefringence $\Delta n$ of 0.085. In this manner, a liquid crystal panel was produced. Table 7 shows a relationship between the vinyl-type monomer concentration and the pretilt angle.

TABLE 7

|  | number of fluorine groups | |
|---|---|---|
|  | 0 | 4 |
| pretilt angle (°) | 87.9 | 87.3 |

Next, the resultant liquid crystal panel was subjected to a power-on test of continuously applying a voltage of ±10 V for 50 hours at room temperature, and thereafter an amount of change in the tilt angle was measured. Table 8 shows results thereof.

TABLE 8

|  | number of fluorine groups | |
|---|---|---|
|  | 0 | 4 |
| pretilt angle (°) | 87.9 | 87.3 |
| amount of change in the tilt angle (°) | 0.14 | 0.09 |

As will be understood from Table 8, similarly to Example 1-1, when the monomer had any fluorine groups, the density of the monomer and polyvinyl compound pv present on the surface of the first and second alignment films 110 and 120 was increased, whereby the change in the tilt angle was suppressed. A voltage holding ratio measured after finishing the power-on test was 99.5% or more, indicative that powering had been sufficiently conducted.

Reference Example

Hereinafter, an alignment film and a liquid crystal display device of Reference Example will be described. The liquid crystal display device of Reference Example also operates in the RTN mode.

First, on a principal face of a first insulative substrate, TFTs and wiring lines connected to the TFTs, and an insulating layer and the like were formed, upon which pixel electrodes were formed. Similarly, on a principal face of a second insulative substrate, a colored layer having color filters, and an insulating layer and the like were formed, upon which a counter electrode was formed.

Next, a vertical-alignment type alignment film material was provided. This alignment film material was an alignment film material intended for use in a photo-alignment film. The alignment film material was formed by, after allowing a precursor of the first polyimide and the second polyimide and a precursor thereof to be dissolved in a solvent, adding a vinyl-type monomer thereto. The precursor of the first polyimide was a polyamic acid as represented by structural formula (2a), and the second polyimide was a photo-alignable polyimide as represented by structural formula (3a'). The fraction of imide units of the second polyimide was approximately 50%.

Herein, a diacrylate monomer as represented by structural formula (1r) was added as the vinyl-type monomer.

[Formula 24]

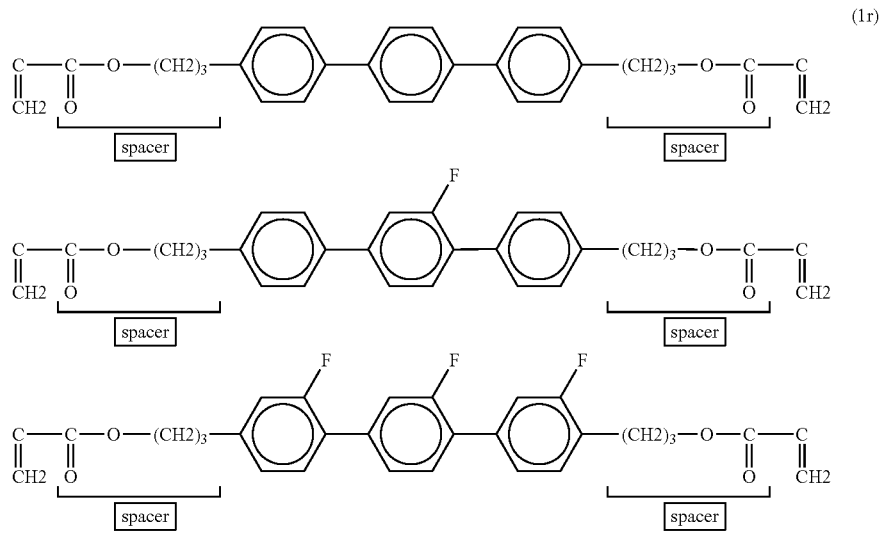

(1r)

As will be understood from structural formula (1r), a spacer is added to this diacrylate monomer, which makes the monomer longer than the monomer represented by structural formula (1a).

The concentration of the diacrylate monomer was 10 wt % on the basis of the alignment film material. Herein, three kinds of alignment film materials were provided which had 0, 1, or 3 fluorine groups per monomer.

Next, after applying the alignment film material on the pixel electrodes by a printing technique, ink jet technique, or spin coating technique, the solvent was removed to a certain extent through one minute of heating at 90° C. as a first heat treatment (pre-bake), further followed by 40 minutes of heating at 200° C. as a second heat treatment. As a result, a first alignment film was formed on the pixel electrodes. No polyvinyl compound was formed on this first alignment film.

Next, obliquely from a 40° direction with respect to the normal direction of a principal face of the first alignment film, P-polarized light with a peak wavelength of 330 nm was radiated at 50 mJ/cm², thus performing a photo-alignment treatment. Through such light irradiation, the cinnamate group underwent a dimerization reaction, whereby a dimerization site was formed. Similarly, the aforementioned alignment film material was applied to form a second alignment film on the counter electrode, and a photo-alignment treatment was performed.

Next, the active matrix substrate and the counter substrate were attached together so that the first alignment film and the second alignment film opposed each other and that the angle between the alignment treatment direction of the first alignment film and the alignment treatment direction of the second alignment film was 90°, and fixed so that the interspace between the active matrix substrate and the counter substrate was about 4 μm.

Next, a nematic liquid crystal material having negative dielectric anisotropy was provided, which was introduced between the active matrix substrate and the counter substrate. The liquid crystal material had a dielectric anisotropy Δ∈ of −3, and a birefringence Δn of 0.085. In this manner, a liquid crystal panel was produced. Table 9 shows a relationship between the number of fluorine groups per monomer and the pretilt angle.

TABLE 9

| | number of fluorine groups | | |
|---|---|---|---|
| | 0 | 1 | 3 |
| pretilt angle (°) | 88.8 | 88.9 | 88.8 |

As will be understood from Table 9, regardless of the number of fluorine groups, the pretilt angle was substantially constant. This is presumably because the influence which the fluorine group(s) exerted on the liquid crystal alignment was reduced due to the connected $CH_2$ group.

Next, similarly to Examples 1-1 to 1-4, resultant liquid crystal panel was subjected to a power-on test of continuously applying a voltage of ±10V for 50 hours at room temperature, and thereafter an amount of change in the tilt angle was measured. Table 10 shows results thereof.

TABLE 10

| | number of fluorine groups | | |
|---|---|---|---|
| | 0 | 1 | 3 |
| pretilt angle (°) | 88.8 | 88.9 | 88.8 |
| amount of change in the tilt angle (°) | 0.21 | 0.21 | 0.21 |

As will be understood from Table 10, when the monomer represented by structural formula (1r) was added, the amount of change in the tilt angle due to powering was large, irrespective of whether there were any fluorine groups. This is presumably because the spacer portion of the monomer represented by structural formula (1r) is longer than the monomer represented by structural formula (1a), and a plurality of $CH_2$ groups having a relatively high flexibility are connected in the monomer represented by the structural formula (1r). A voltage holding ratio measured after finishing the power-on test was 99.5% or more, indicative that powering had been sufficiently conducted.

Example 2

Hereinafter, with reference to FIG. 2 and FIG. 6, an alignment film and a liquid crystal display device of Example will be described. The liquid crystal display device Example 2 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, a vertical-alignment type alignment film material was provided. The alignment film material was formed by, after allowing a precursor of the first polyimide p1 and the second polyimide p2 and a precursor thereof to be dissolved in a solvent, adding a vinyl-type monomer thereto. The precursor of the first polyimide p1 was a polyamic acid as represented by structural formula (2a), and the second polyimide p2 was a vertical-alignment type polyimide as represented by structural formula (3b'). The fraction of imide units of the second polyimide p2 was approximately 50%. As the vinyl-type monomer, a dimethacrylate monomer as represented by formula (1a) was added, to a concentration of 10 wt % on the basis of the alignment film material. Herein, three kinds of alignment film materials were provided which had 2, 4, or 6 fluorine groups per monomer. For comparison, an alignment film material which had zero fluorine groups per monomer was also provided.

Next, the alignment film material was applied on the pixel electrodes 224 by a printing technique, ink jet technique, or spin coating technique, and the solvent was removed to a certain extent through one minute of heating at 90° C. as a first heat treatment (pre-bake), further followed by 40 minutes of heating at 200° C. as a second heat treatment (full bake). Through such heat treatment, the polyamic acid was imidized to form the first and second polyimides p1 and p2, and the vinyl-type monomer was polymerized to form the polyvinyl compound pv. In this manner, the first alignment film 110 was formed on the pixel electrodes 224.

Thereafter, the first alignment film 110 was subjected to a rubbing treatment. Similarly, the aforementioned alignment film material was applied to form the second alignment film 120 on the counter electrode 244, which was subjected to a rubbing treatment.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy $\Delta\in$ of −3, and a birefringence $\Delta n$ of 0.085. In this manner, a liquid crystal panel was produced. Table 11 shows a relationship between the number of fluorine groups per vinyl-type monomer and the pretilt angle.

TABLE 11

| | number of fluorine groups | | | |
|---|---|---|---|---|
| | 0 | 2 | 4 | 6 |
| pretilt angle (°) | 88.4 | 88.3 | 88.0 | 88.0 |

As will be understood from Table 11, the pretilt angle is large when the number of fluorine groups is zero, whereas the pretilt angle becomes lower when the monomer has any fluorine groups.

Next, the resultant liquid crystal panel was subjected to a power-on test of continuously applying a voltage of ±10V for 50 hours at room temperature, and thereafter an amount of change in the tilt angle was measured. Table 12 shows results thereof.

TABLE 12

| | number of fluorine groups | | | |
|---|---|---|---|---|
| | 0 | 2 | 4 | 6 |
| pretilt angle (°) | 88.4 | 88.3 | 88.0 | 88.0 |
| amount of change in the tilt angle (°) | 0.11 | 0.03 | 0.02 | 0.02 |

As will be understood from Table 12, the amount of change in the tilt angle is reduced when the monomer has a fluorine group. This is presumably because the density of the vinyl-type monomer or the polyvinyl compound pv present on the surface of the first and second alignment films 110 and 120 was increased due to the fluorine group, so that the change in the tilt angle of the liquid crystal molecules 262 was reduced due to interaction between the polyvinyl compound pv and the liquid crystal molecules 262. A voltage holding ratio measured after finishing the power-on test was 99.5% or more, indicative that powering had been sufficiently conducted.

Example 3

Hereinafter, with reference to FIG. 2 and FIG. 6, an alignment film and a liquid crystal display device of Example 3 will be described. The liquid crystal display device Example 3 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, a vertical-alignment type alignment film material was provided. The alignment film material was formed by, after allowing a precursor of the first polyimide p1 and the second polyimide p2 and a precursor thereof to be dissolved in a solvent, adding a vinyl-type monomer thereto. The precursor of the first polyimide p1 was a polyamic acid as represented by structural formula (2a), and the second polyimide p2 was a vertical-alignment type polyimide as represented by structural formula (3b'). The fraction of imide units of the second polyimide p2 was approximately 50%. As the vinyl-type monomer, a dimethacrylate monomer as represented by formula (1a) was added, to a concentration of 10 wt % on the basis of the alignment film material. Herein, three kinds of alignment film materials were provided which had 2, 4, or 6 fluorine groups per monomer. For comparison, an alignment film material which had zero fluorine groups per monomer was also provided.

Next, the alignment film material was applied on the pixel electrodes 224 by a printing technique, ink jet technique, or spin coating technique, and the solvent was removed to a certain extent through one minute of heating at 90° C. as a first heat treatment (pre-bake), further followed by 40 minutes of heating at 200° C. as a second heat treatment (full bake). Through such heat treatment, the polyamic acid was imidized to form the first and second polyimides p1 and p2, and the vinyl-type monomer was polymerized to form the polyvinyl compound pv. In this manner, the first alignment film 110 was formed on the pixel electrodes 224.

Thereafter, the first alignment film 110 was irradiated with an ion beam, thus conducting an alignment treatment. Similarly, the aforementioned alignment film material was applied to form the second alignment film 120 on the counter electrode 244, and this was irradiated with an ion beam to conduct an alignment treatment.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 µm.

Next, a nematic liquid crystal material having negative dielectric anisotropy was provided, which was introduced between the active matrix substrate 220 and the counter substrate 240. The liquid crystal material had a dielectric anisotropy $\Delta\epsilon$ of −3, and a birefringence $\Delta n$ of 0.085. In this manner, a liquid crystal panel was produced. Table 13 shows a relationship between the number of fluorine groups per monomer and the pretilt angle.

TABLE 13

| | number of fluorine groups | | | |
|---|---|---|---|---|
| | 0 | 2 | 4 | 6 |
| pretilt angle (°) | 86.9 | 86.6 | 86.5 | 86.5 |

As will be understood from Table 13, the pretilt angle is lowered when the monomer has any fluorine groups. Presumably, the reason why the pretilt angle was smaller than in the case where a rubbing treatment was performed is that some of the vertical-alignment type polyimide had decomposed due to the ion beam irradiation.

Next, the resultant liquid crystal panel was subjected to a power-on test of continuously applying a voltage of ±10 V for 50 hours at room temperature, and thereafter an amount of change in the tilt angle was measured. Table 14 shows results thereof.

TABLE 14

| | number of fluorine groups | | | |
|---|---|---|---|---|
| | 0 | 2 | 4 | 6 |
| pretilt angle (°) | 86.9 | 86.6 | 86.5 | 86.5 |
| amount of change in the tilt angle (°) | 0.16 | 0.06 | 0.04 | 0.04 |

As will be understood from Table 14, the amount of change in the tilt angle is reduced when the monomer has a fluorine group. This is presumably because the density of the vinyl-type monomer or the polyvinyl compound pv present on the surface of the first and second alignment films 110 and 120 was increased due to the fluorine group, so that the change in the tilt angle of the liquid crystal molecules 262 was reduced due to interaction between the polyvinyl compound pv and the liquid crystal molecules 262. A voltage holding ratio measured after finishing the power-on test was 99.5% or more, indicative that powering had been sufficiently conducted.

Example 4

Hereinafter, with reference to FIG. 2 and FIG. 7, an alignment film and a liquid crystal display device of Example will be described. The liquid crystal display device Example 4 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, a vertical-alignment type alignment film material was provided. This alignment film material was an alignment film material intended for use in a photo-alignment film. The alignment film material was formed by, after allowing a precursor of the first polyimide p1 and the second polyimide p2 and a precursor thereof to be dissolved in a solvent, adding a vinyl-type monomer thereto. The precursor of the first polyimide p1 was a polyamic acid as represented by structural formula (2a), and the second polyimide p2 was a photo-alignable polyimide as represented by structural formula (3 at). The fraction of imide units of the second polyimide p2 was approximately 50%. As the vinyl-type monomer, a dimethacrylate monomer as represented by formula (1a) was added, to a concentration of 10 wt % on the basis of the alignment film material. Herein, a dimethacrylate monomer having four fluorine groups per monomer was provided.

Next, the alignment film material was applied on the pixel electrodes 224 by a printing technique, ink jet technique, or spin coating technique, and the solvent was removed to a certain extent through one minute of heating at 90° C. as a first heat treatment (pre-bake), further followed by 40 minutes of heating at 200° C. as a second heat treatment (full bake). Through such heat treatments, the polyamic acid was imidized, and the first alignment layer 112 containing the first polyimide p1 and the second alignment layer 114 containing the second polyimide p2 were formed.

Thereafter, regions of the first alignment film 110 each corresponding to a half of a pixel were irradiated at 50 mJ/cm² with P-polarized light having a peak wavelength of 330 nm, at an azimuth angle of 0° and obliquely from a 40° direction with respect to the normal direction of a principal face of the first alignment film 110. When the light irradiation was performed, the cinnamate group underwent a dimerization reaction, whereby a dimerization site was formed. Next, regions each corresponding to the other half of a pixel of the first alignment film 110 were irradiated at 50 mJ/cm² with P-polarized light having a peak wavelength of 330 nm, at an azimuth angle of 180° and obliquely from a 40° direction with respect to the normal direction of the principal face of the first alignment film 110. Thus, photo-alignment treatments were performed to form regions with different alignment treatment directions.

Similarly, the aforementioned alignment film material was applied on the counter electrode 244, and the solvent was removed to a certain extent through one minute of heating at 90° C., further followed by 40 minutes of heating at 200° C. The first polyimide p1 was formed, and dimethacrylate was polymerized to form the polyvinyl compound pv. In this manner, the second alignment film 120 was formed on the counter electrode 244. Thereafter, each pixel of the second alignment film 120 was irradiated at 50 mJ/cm² with P-polarized light having a peak wavelength of 330 nm, obliquely from a 40° direction with respect to the normal direction of the principal face of the second alignment film 120. Thus, a photo-alignment treatment was performed. Upon analyzing the first and second alignment films 110 and 120, the dimethacrylate represented by formula (1a) had been polymerized, and the polyvinyl compound pv existed also on the alignment film surface.

Next, the active matrix substrate 220 and the counter substrate 240 were attached together so that the first alignment film 110 and the second alignment film 120 opposed each other and that the angles between the alignment treatment directions of the first alignment film and the alignment treatment direction of the second alignment film were 90°, and fixed so that the interspace between the active matrix substrate 220 and the counter substrate 240 was about 4 µm.

Next, a nematic liquid crystal material having negative dielectric anisotropy was provided, which was introduced between the active matrix substrate 220 and the counter substrate 240. The liquid crystal material had a dielectric anisotropy $\Delta\in$ of −3, and a birefringence $\Delta n$ of 0.085.

Figure 7:
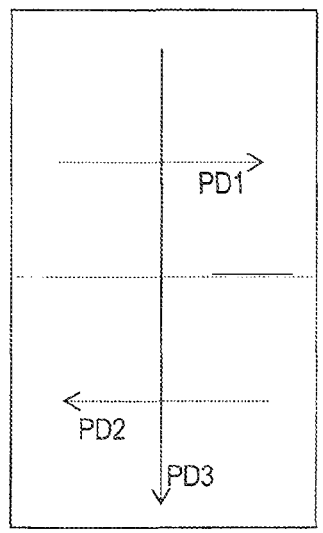
FIG. 7 A schematic diagram showing alignment treatment directions for the first and second alignment films as viewed from the viewer's side, in a liquid crystal display device of Example 4

FIG. 7 shows the alignment treatment directions of the first and second alignment films 110 and 120 of Example 4. As described above, the active matrix substrate 220 and the counter substrate 240 were attached together so that the angles between the alignment treatment directions PD1 and PD2 of the first alignment film 110 and the alignment treatment direction PD3 of the second alignment film 120 were 90°, and the liquid crystal molecules 262 had a twist angle of 90°. A voltage holding ratio measured after finishing the power-on test was 99.5% or more, indicative that powering had been sufficiently conducted.

Example 5

Hereinafter, with reference to FIG. 2 and FIG. 8, an alignment film and a liquid crystal display device of Example will be described. The liquid crystal display device Example 5 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, a vertical-alignment type alignment film material was provided. This alignment film material was an alignment film material intended for use in a photo-alignment film. The alignment film material was formed by, after allowing a precursor of the first polyimide p1 and the second polyimide p2 and a precursor thereof to be dissolved in a solvent, adding a vinyl-type monomer thereto. The precursor of the first polyimide p1 was a polyamic acid as represented by structural formula (2a), and the second polyimide p2 was a photo-alignable polyimide as represented by structural formula (3a'). The fraction of imide units of the second polyimide p2 was approximately 50%. As the vinyl-type monomer, a dimethacrylate monomer as represented by formula (1a) was added, to a concentration of 10 wt % on the basis of the alignment film material. Herein, four kinds of alignment film materials were provided which had 0, 2, 4, or 6 fluorine groups per monomers.

Next, the alignment film material was applied on the pixel electrodes 224 by a printing technique, ink jet technique, or spin coating technique, and the solvent was removed to a certain extent through one minute of heating at 90° C. as a first heat treatment (pre-bake), further followed by 40 minutes of heating at 200° C. as a second heat treatment (full bake). Through such heat treatment, the polyamic acid was imidized, whereby the first alignment layer 112 containing the first polyimide p1 and the second alignment layer 114 containing the second polyimide p2 were formed. In this manner, the first alignment film 110 was formed on the pixel electrodes 224.

Thereafter, regions of the first alignment film 110 each corresponding to a half of a pixel were irradiated at 50 mJ/cm² with P-polarized light having a peak wavelength of 330 nm, at an azimuth angle of 0° and obliquely from a 40° direction with respect to the normal direction of a principal face of the first alignment film 110. When the light irradiation was performed, the cinnamate group underwent a dimerization reaction, whereby a dimerization site was formed. Next, regions each corresponding to the other half of a pixel of the first alignment film 110 were irradiated at 50 mJ/cm² with P-polarized light having a peak wavelength of 330 nm, at an azimuth angle of 180° and obliquely from a 40° direction with respect to the normal direction of the principal face of the first alignment film 110. Thus, photo-alignment treatments were performed to form regions with different alignment treatment directions.

As in the first alignment film 110, the aforementioned alignment film material was applied on the counter electrode 244, and the solvent was removed to a certain extent through one minute of heating at 90° C., further followed by 40 minutes of heating at 200° C. As a result, the polyamic acid was imidized, whereby the first alignment layer 122 containing the first polyimide p1 and the second alignment layer 124 containing the second polyimide p2 were formed. In this manner, the second alignment film 120 was formed on the counter electrode 244.

Thereafter, regions of the second alignment film 120 each corresponding to a half of a pixel were irradiated at 50 mJ/cm² with P-polarized light having a peak wavelength of 330 nm, at an azimuth angle 90° and obliquely from a 40° direction with respect to the normal direction of a principal face of the second alignment film 120. When the light irradiation was performed, the cinnamate group underwent a dimerization reaction, whereby a dimerization site was formed. Next, regions each corresponding to the other half of a pixel of the second alignment film 120 were irradiated at 50 mJ/cm² with P-polarized light having a peak wavelength of 330 nm, at an azimuth angle 270° and obliquely from a 40° direction with respect to the normal direction of the principal face of the second alignment film 120. Thus, photo-alignment treatments were performed to form regions with different alignment treatment directions. Upon analyzing the first and second alignment films 110 and 120, the dimethacrylate represented by formula (1a) had been polymerized, and the polyvinyl compound pv existed also on the alignment film surface.

Next, the active matrix substrate 220 and the counter substrate 240 were attached together so that the first alignment film 110 and the second alignment film 120 opposed each other and that the angles between the alignment treatment directions of the first alignment film and the alignment treatment directions of the second alignment film were 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy $\Delta \in$ of −3, and a birefringence $\Delta n$ of 0.085.

Figure 8:
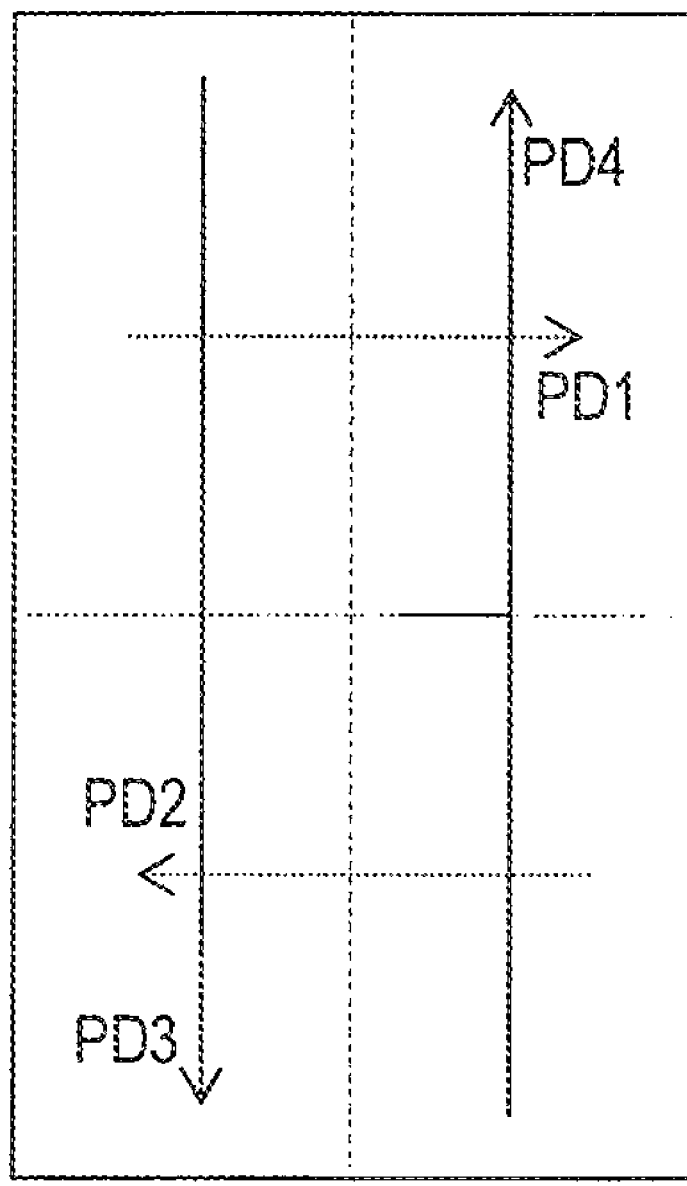
FIG. 8 A schematic diagram showing alignment treatment directions for the first and second alignment films as viewed from the viewer's side, in a liquid crystal display device of Example 5.

FIG. 8 shows the alignment treatment directions of the first and second alignment films 110 and 120 of Example 5. As described above, the active matrix substrate 220 and the counter substrate 240 were attached together so that the angles between the alignment treatment directions PD1 and PD2 of the first alignment film 110 and the alignment treatment directions PD3 and PD4 of the second alignment film 120 were 90°, and the liquid crystal molecules 262 had a twist angle of 90°. A voltage holding ratio measured after finishing the power-on test was 99.5% or more, indicative that powering had been sufficiently conducted.

For reference sake, the entire disclosure of Japanese Patent Application No. 2008-271376, on which the present application claims priority, is incorporated herein by reference.

INDUSTRIAL APPLICABILITY

An alignment film according to the present invention is able to suppress image sticking caused by changes in the pretilt angle. Moreover, a liquid crystal display device according to the present invention can be easily produced. For example, there is no need to perform polymerization after attaching an active matrix substrate and a counter substrate together, thus providing an increased degree of freedom in terms of production.

REFERENCE SIGNS LIST 100 alignment film
p1 first polyimide
p2 second polyimide
pv polyvinyl compound
102 first alignment layer
104 second alignment layer
110 first alignment film
112 first alignment layer
114 second alignment layer
120 second alignment film
122 first alignment layer
124 second alignment layer
200 liquid crystal display device
220 active matrix substrate
222 first insulative substrate
224 pixel electrode
240 counter substrate
242 second insulative substrate
244 counter electrode
260 liquid crystal layer
262 liquid crystal molecules
300 liquid crystal panel

The invention claimed is:

1. An alignment film material comprising:
  a precursor of a first polyimide;
  at least one of a second polyimide and a precursor thereof, the second polyimide being different from the first polyimide; and
  a vinyl-type monomer having a vinyl group, wherein the vinyl-type monomer is represented by general formula (1) P1-A1-(Z1-A2)n-P2 (in general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and Z1 is a —COO— group, a —OCO— group, a —O— group, a —CONH— group or a single bond, where n is 0 or 1).

2. The alignment film material of claim 1, wherein the vinyl-type monomer is a bifunctional monomer having a symmetric structure.

3. The alignment film material of claim 1, wherein the vinyl-type monomer is a dimethacrylate monomer.

4. The alignment film material of claim 1, wherein the vinyl-type monomer is represented by structural formula (1a)

[Formula 1]

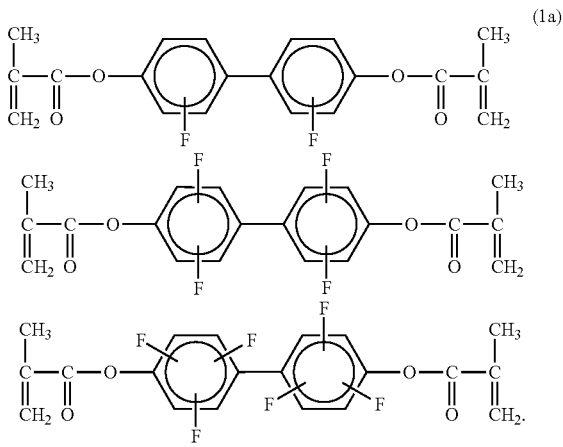

5. The alignment film material of claim 1, wherein the precursor of the first polyimide is represented by general formula (2)

[Formula 2]

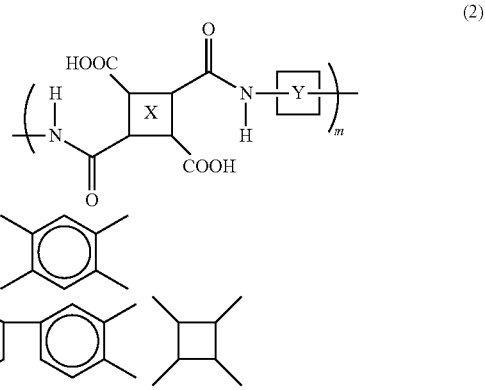

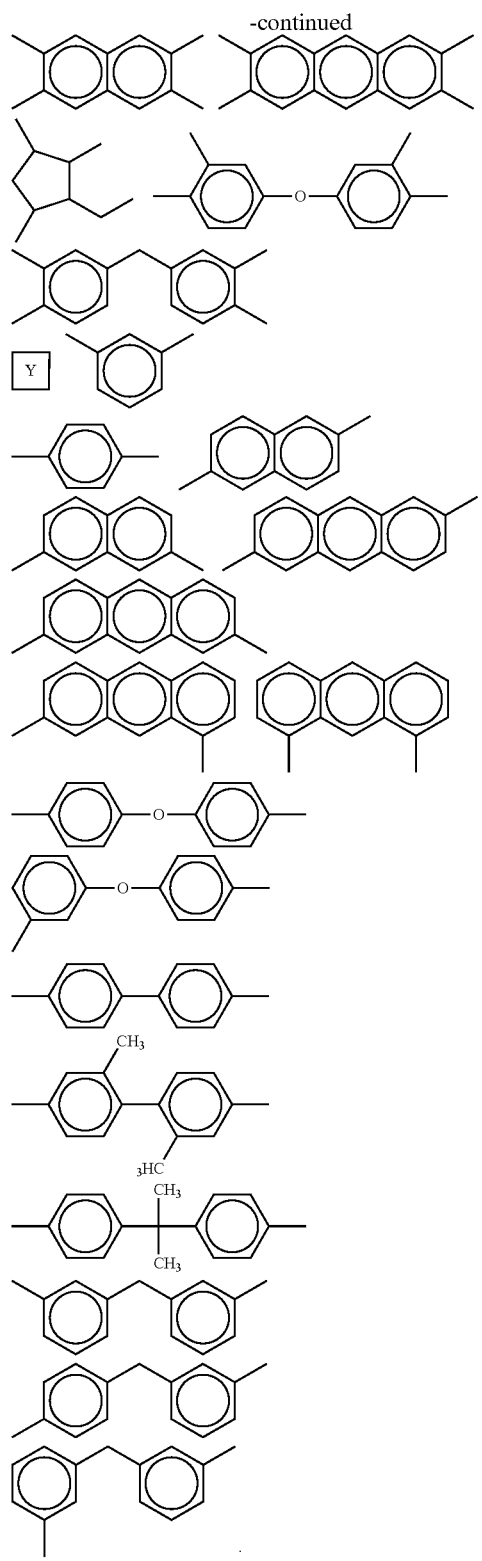
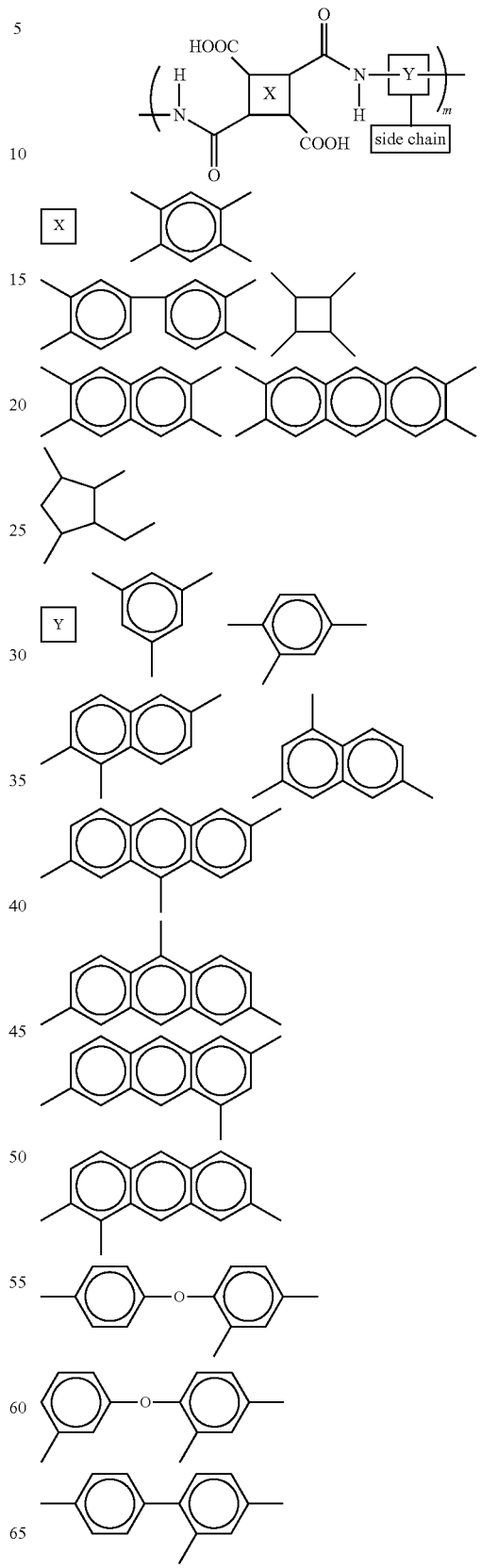
6. The alignment film material of claim 1, wherein a side chain of the precursor of the first polyimide does not have any vertical alignment groups.
7. The alignment film material of claim 1, wherein,
the precursor of the second polyimide is represented by general formula (3); and

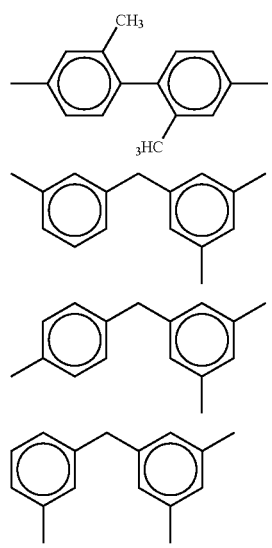

the second polyimide is represented by general formula (3')

[Formula 4]

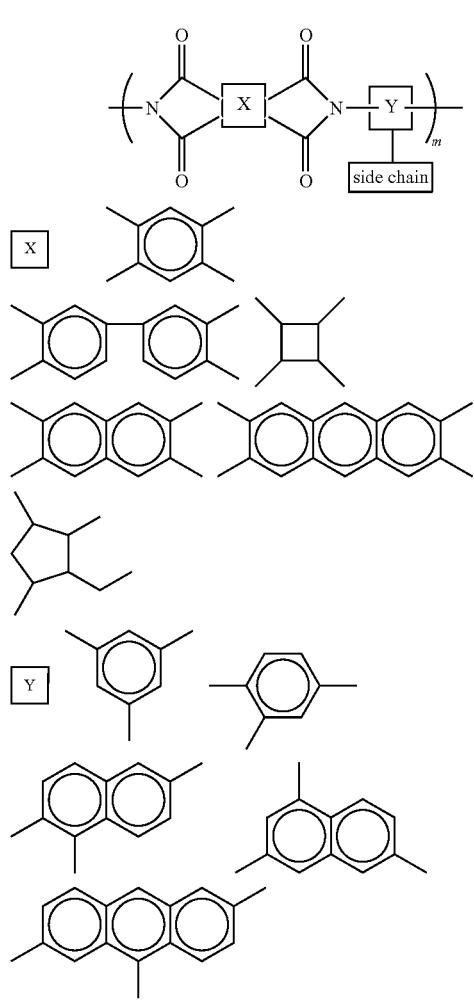

(3')

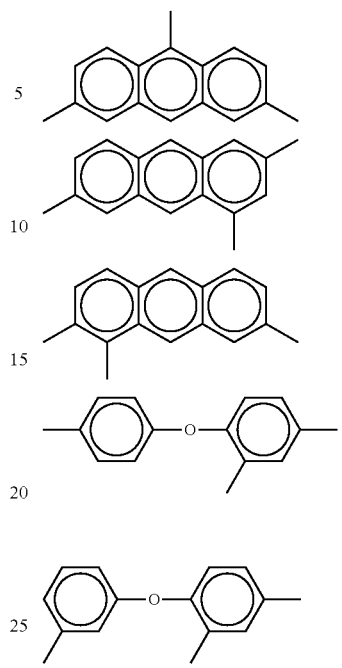

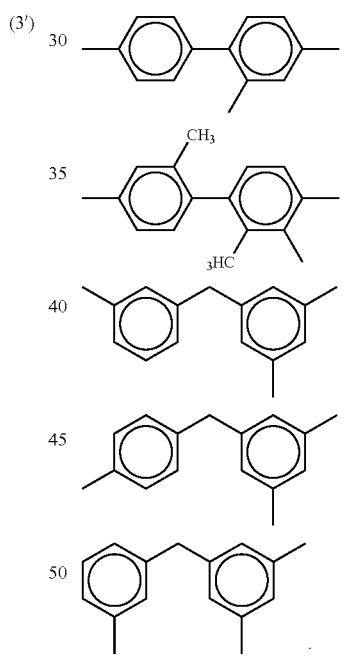

8. The alignment film material of claim 1, wherein the second polyimide has a side chain including a fluorine group.

9. The alignment film material of claim 1, wherein the second polyimide has a photoreactive functional group.

10. The alignment film material of claim 9, wherein the photoreactive functional group is at least one selected from the group consisting of a cinnamate group, a chalcone group, a tolan group, a coumarin group, and an azobenzene group.

11. The alignment film material of claim 9, wherein at least one of the second polyimide and the precursor thereof has a side chain represented by general formula (4)

[Formula 5]

(4)

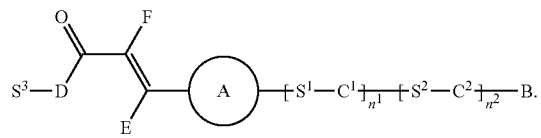

12. The alignment film material of claim 1, wherein at least one of the second polyimide and the precursor thereof has a side chain including a vertical alignment group.

13. The alignment film material of claim 1, wherein a concentration of the vinyl-type monomer on the basis of the alignment film material is no less than 2 wt % and no more than 20 wt %.

14. An alignment film comprising:
a first polyimide;
a second polyimide different from the first polyimide; and
a polyvinyl compound resulting from polymerization of a vinyl-type monomer, wherein
the vinyl-type monomer is represented by general formula (1) P1-A1-(Z1-A2)n-P2 (in general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and Z1 is a —COO— group, a —OCO— group, a —O— group, a —CONH— group or a single bond, where n is 0 or 1).

15. The alignment film of claim 14, wherein the alignment film has a first alignment layer containing the first polyimide and a second alignment layer containing the second polyimide.

16. The alignment film of claim 15, wherein the polyvinyl compound is present within the second alignment layer and on a surface of the second alignment layer.

17. A liquid crystal display device comprising:
an active matrix substrate having a pixel electrode;
a counter substrate having a counter electrode; and
a vertical-alignment type liquid crystal layer provided between the active matrix substrate and the counter substrate, wherein,
at least one of the active matrix substrate and the counter substrate further includes an alignment film provided on the liquid crystal layer side;
the alignment film includes
a first polyimide,
a second polyimide different from the first polyimide, and
a polyvinyl compound resulting from polymerization of a vinyl-type monomer; and
the vinyl-type monomer is represented by general formula (1) P1-A1-(Z1-A2)n-P2 (in general formula (1), P1 and P2 are, independently, acrylate, methacrylate, acrylamide or methacrylamide; A1 and A2 represent, independently, 1,4-phenylene, 1,4-cyclohexane or 2,5-thiophene, or naphthalene-2,6-diyl or anthracene-2,7-diyl; at least one of A1 and A2 is substituted by at least one fluorine group; and Z1 is a —COO— group, a —OCO— group, a —O— group, a —CONH— group or a single bond, where n is 0 or 1).

18. The liquid crystal display device of claim 17, wherein the alignment film has a first alignment layer containing the first polyimide and a second alignment layer containing the second polyimide.

19. The liquid crystal display device of claim 18, wherein,
the second alignment layer is provided so as to be closer to the liquid crystal layer than is the first alignment layer; and
the polyvinyl compound is present within the second alignment layer and on a surface of the second alignment layer.

20. The liquid crystal display device of claim 17, wherein the alignment film regulates liquid crystal molecules in the liquid crystal layer so that the liquid crystal molecules are inclined with respect to a normal direction of a principal face of the alignment film in the absence of an applied voltage.

21. The liquid crystal display device of claim 17, wherein the liquid crystal display device has a plurality of pixels; and
in each of the plurality of pixels, the liquid crystal layer has a plurality of liquid crystal domains having respectively different reference alignment azimuths.

22. The liquid crystal display device of claim 21, wherein the plurality of liquid crystal domains are four liquid crystal domains.

23. A method of forming an alignment film, comprising the steps of:
providing an alignment film material containing a precursor of a first polyimide, at least one of a second polyimide and a precursor thereof, and a vinyl-type monomer, the second polyimide being different from the first polyimide;
applying the alignment film material; and
heating the alignment film material so that at least a portion of the precursor of the first polyimide is imidized into the first polyimide and that the vinyl-type monomer is polymerized to form a polyvinyl compound,
wherein, in the step of providing the alignment film material the vinyl-type monomer is represented by general formula (1) P1-A1-(Z1-A2)n-P2 (in general formula (1), P1 and P2 are, independently, acrylate, methacrylate, acrylamide or methacrylamide; A1 and A2 represent, independently, 1,4-phenylene 1,4-cyclohexane or 25-thiophene, or napthalene-2,6-diyl or anthracene-2,7-diyl; at least one of A1 and A2 is substituted by at least one fluorine group; and Z1 is a —COO— group, a —OCO— group, a —O— group, a —CONH— group or a single bond, where n is 0 or 1).

24. The method of forming an alignment film of claim 23, wherein, after the step of heating, a fraction of imide units of the second polyimide is greater than a fraction of imide units of the first polyimide.

25. The method of forming an alignment film of claim 23, wherein the step of applying the alignment film material comprises a step of performing the application of the alignment film material by a printing technique, an ink jet technique, or a spin coating technique.

* * * * *